(12) United States Patent
Imbrenda et al.

(10) Patent No.: US 11,176,054 B2
(45) Date of Patent: Nov. 16, 2021

(54) HOST VIRTUAL ADDRESS SPACE FOR SECURE INTERFACE CONTROL STORAGE

(71) Applicant: International Business Machines Corporation, Armonk, NY (US)

(72) Inventors: Claudio Imbrenda, Boeblingen (DE); Christian Borntraeger, Stuttgart (DE); Lisa Cranton Heller, Rhinebeck, NY (US); Fadi Y. Busaba, Poughkeepsie, NY (US); Jonathan D. Bradbury, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 16/296,301

(22) Filed: Mar. 8, 2019

(65) Prior Publication Data
US 2020/0285589 A1    Sep. 10, 2020

(51) Int. Cl.
*G06F 12/1009*    (2016.01)
*G06F 9/455*    (2018.01)

(52) U.S. Cl.
CPC ...... *G06F 12/1009* (2013.01); *G06F 9/45558* (2013.01); *G06F 2009/45587* (2013.01); *G06F 2212/657* (2013.01)

(58) Field of Classification Search
CPC ....... G06F 9/45558; G06F 2009/45587; G06F 2212/657; G06F 12/10
See application file for complete search history.

(56) References Cited

U.S. PATENT DOCUMENTS

| 4,245,302 A | 1/1981 | Amdahl |
| 4,787,031 A | 11/1988 | Karger et al. |
| 6,678,815 B1 | 1/2004 | Mathews et al. |

(Continued)

FOREIGN PATENT DOCUMENTS

| CN | 102103552 A | 6/2011 |
| CN | 102594852 A | 7/2012 |

(Continued)

OTHER PUBLICATIONS

International Application No. PCT/IB2020/051946 International Search Report and Written Opinion dated Jun. 15, 2020, 9 pages (M230498US).

(Continued)

*Primary Examiner* — Michelle T Bechtold
(74) *Attorney, Agent, or Firm* — Cantor Colburn LLP; Steven Chiu

(57) ABSTRACT

According to one or more embodiments of the present invention, a computer implemented method includes receiving, at a secure interface control of a computer system, an access request for a data structure related to a secure entity in a secure domain of the computer system. The secure interface control can check for a virtual storage address associated with a location of the data structure. The secure interface control can request an address translation using a virtual address space of a non-secure entity of the computer system based on determining that the location of the data structure is associated with the virtual storage address. The secure interface control can access the data structure based on a result of the address translation.

18 Claims, 20 Drawing Sheets

(56) References Cited

U.S. PATENT DOCUMENTS

| | | | |
|---|---|---|---|
| 7,191,440 B2 | 3/2007 | Cota-Robles et al. | |
| 7,194,740 B1 | 3/2007 | Frank et al. | |
| 7,433,951 B1 | 10/2008 | Waldspurger | |
| 7,475,166 B2 | 1/2009 | Arndt et al. | |
| 7,673,103 B2 | 3/2010 | Chaudhry et al. | |
| 7,685,635 B2 | 3/2010 | Vega et al. | |
| 7,725,559 B2 | 5/2010 | Landis et al. | |
| 7,984,108 B2 | 7/2011 | Landis et al. | |
| 8,010,763 B2 | 8/2011 | Armstrong et al. | |
| 8,037,530 B1 | 10/2011 | Fink et al. | |
| 8,108,873 B1 | 1/2012 | Frank et al. | |
| 8,151,032 B2 | 4/2012 | Oshins | |
| 8,261,320 B1 | 9/2012 | Serenyi et al. | |
| 8,510,599 B2 | 8/2013 | Coneski et al. | |
| 8,799,892 B2 | 8/2014 | Hepkin | |
| 9,135,159 B2 | 9/2015 | Yoo et al. | |
| 9,483,639 B2 | 11/2016 | Sliwa et al. | |
| 9,558,004 B1 | 1/2017 | Alonzo et al. | |
| 9,672,058 B2 | 6/2017 | Sliwa et al. | |
| 9,710,395 B1 | 7/2017 | Garibay et al. | |
| 10,013,579 B2 | 7/2018 | Elbaz et al. | |
| 10,031,759 B2 | 7/2018 | Sutton et al. | |
| 10,387,686 B2 | 8/2019 | Boivie et al. | |
| 10,474,382 B2 | 11/2019 | Van Riel et al. | |
| 2003/0226014 A1 | 12/2003 | Schmidt et al. | |
| 2005/0114616 A1 | 5/2005 | Tune | |
| 2007/0028244 A1 | 2/2007 | Landis et al. | |
| 2007/0094323 A1 | 4/2007 | Smith | |
| 2008/0294866 A1 | 11/2008 | Kurichiyath et al. | |
| 2009/0037906 A1 | 2/2009 | Armstrong et al. | |
| 2009/0216995 A1 | 8/2009 | Heller et al. | |
| 2009/0217098 A1 | 8/2009 | Farrell et al. | |
| 2009/0222816 A1* | 9/2009 | Mansell | G06F 12/145 718/1 |
| 2009/0307440 A1 | 12/2009 | Jacobs et al. | |
| 2009/0307686 A1 | 12/2009 | Hepkin | |
| 2011/0153944 A1 | 6/2011 | Kursawe | |
| 2012/0297177 A1 | 11/2012 | Ghosh et al. | |
| 2012/0317569 A1 | 12/2012 | Payne, Jr. et al. | |
| 2013/0036449 A1 | 2/2013 | Mukkara et al. | |
| 2014/0007189 A1 | 1/2014 | Huynh et al. | |
| 2014/0143826 A1 | 5/2014 | Sharp et al. | |
| 2014/0157363 A1 | 6/2014 | Banerjee | |
| 2015/0248357 A1 | 9/2015 | Kaplan et al. | |
| 2015/0378930 A1* | 12/2015 | Sahita | G06F 9/45558 711/207 |
| 2015/0381590 A1 | 12/2015 | Bosko et al. | |
| 2016/0162322 A1 | 6/2016 | Wu et al. | |
| 2016/0350018 A1 | 12/2016 | Tsirkin et al. | |
| 2016/0371496 A1 | 12/2016 | Sell | |
| 2017/0054557 A1 | 2/2017 | Rozas et al. | |
| 2017/0075818 A1 | 3/2017 | Liu et al. | |
| 2017/0230179 A1 | 8/2017 | Mannan | |
| 2018/0048709 A1 | 2/2018 | Martini | |
| 2018/0114012 A1 | 4/2018 | Sood et al. | |
| 2018/0189190 A1* | 7/2018 | Kaplan | G06F 9/45558 |
| 2018/0260251 A1 | 9/2018 | Beveridge et al. | |
| 2018/0260337 A1 | 9/2018 | Brandt et al. | |
| 2018/0285138 A1 | 10/2018 | Jeong et al. | |
| 2018/0285140 A1 | 10/2018 | Kaplan et al. | |
| 2018/0285143 A1 | 10/2018 | Bacher et al. | |
| 2019/0045016 A1 | 2/2019 | Dewan et al. | |
| 2019/0087586 A1 | 3/2019 | McKeen et al. | |
| 2020/0201786 A1 | 6/2020 | Quziel | |
| 2020/0250318 A1 | 8/2020 | Al Belooshi | |

FOREIGN PATENT DOCUMENTS

| | | | |
|---|---|---|---|
| CN | 103729230 A | 4/2014 | |
| TW | 201419150 A | 5/2014 | |
| TW | 201610745 A | 3/2016 | |
| WO | 2005036358 A2 | 4/2005 | |
| WO | 2013054528 A1 | 4/2013 | |
| WO | 2015132753 A1 | 9/2015 | |
| WO | 2016081867 A1 | 5/2016 | |

OTHER PUBLICATIONS

International Search Report and Written Opinion for Application No. PCT/EP2020/055979; International Filing Date Mar. 6, 2020; dated May 28, 2020; 10 pages.

Jin et al., "Architectural Support for Secure Virtulization under a Vulnerable Hypervisor" Proceedings of the 44th Annual IEEE/ACM International Symposium on Microarchitecture, Micro-44, Jan. 2011, 12 pages.

"Main Memory: Address Translation"; CS 4410 Operating Systems; Cornell CIS; 2017; 38 Pages.

"Mechanism: Address Translation"; Operating Systems; www.ostep.org; 2008; 14 Pages.

Boivie et al.; Hardware Support for Malware Defense and End-to-End Trust; International Business Machines Corporation TJ Watson Research Center Yorktown Heights United States; 2017; 81 Pages.

Disclosed Anonymously; "Enhancement to VMM Page Replacement to Incorporate EFS(Encrypted File System) Awareness"; IP.com No. IPCOM000216343D; IP.com Publication Date: Mar. 31, 2012; 13 Pages.

Disclosed Anonymously; "Leakage Resilent Could Storage"; IP.com No. IPCOM000211368D; IP.com Publication Date: Sep. 29, 2011; 6 Pages.

Disclosed Anonymously; Methods for Efficiently Moving Portions of a Partition's Address Space; IP.com No. IPCOM00019585D; IP.com Publication Date: May 19, 2010; 4 Pages.

Hunt; Protected Execution Facility: Secure Computing for Linux and OpenPOWER; 2018; 29 Pages.

IBM; Non-Intrusive Execution of Hypervisor Code in a Virtual Server Environment; IP.com No. IPCOM000133819D; IP.com Publication Date: Feb. 10, 2006; 3 Pages.

Lisa Cranton Heller et al., "Controlling Access To Secure Storage of a Virtual Machine", U.S. Appl. No. 16/296,315, filed Mar. 8, 2018.

Lisa Cranton Heller et al., "Secure Interface Control Secure Storage Hardware Tagging", U.S. Appl. No. 16/296,450, filed Mar. 8, 2018.

Lisa Cranton Heller et al., "Testing Storage Protection Hardware in a Secure Virtual Machine Environment", U.S. Appl. No. 16/296,310, filed Mar. 8, 2018.

List of IBM Patents or Patent Afflictions Treated as Related; Appendix P; Date Filed Jul. 29, 2019; 2 Pages.

Mel et al., "The NIST Definition of Cloud Computing," National Institute of Standards and Technology, Information Technology Laboratory, Special Publication 800-145, Sep. 2011 (pp. 1-7).

Siemens et al.; "Easy and Secure Access to Confidential Healthcare Data from Telematics Infrastructure"; IP.com No. IPCOM000141041D; IP.com Publication Date: Oct. 25, 2006; 6 Pages.

Srinivasan et al.; "Virtualization Technique for Effective Resource Utilization and Dedicated Resource Management"; International Research Journal of Engineering and Technology; vol. 4, Issue 5; May 2017; 3 Pages.

Utz Bacher et al., "Secure Storage Query and Donation", U.S. Appl. No. 16/296,311, filed Mar. 8, 2018.

AlJahdali et al.; "Enhancing Multi-Tenancy Security in the Cloud IaaS Model over Public Deployment"; IEEE 2012 (AlJahdali_2012.pdf; pp. 1-6) (Year: 2012).

Barham, et al., Xen and the Art of Virtualization, SOSP '03, Oct. 19-22, 2003, pp. 164-177.

International Application No. PCT/EP2020/056033 International Search Report and Written Opinion dated Jun. 12, 2020, 13 pages (M230485US).

International Application No. PCT/IB2020/051957 International Search Report and Written Opinion dated Jul. 1, 2020, 8 pages (M230503US).

Jin, et al., H-SVM: Hardware-Assisted Secure Virtual Machines under a Vulnerable Hypervisor, IEEE Transactions On Computers, vol. 64, No. 10, Oct. 2015, 14 pages.

TW Office Action dated Jan. 15, 2021, 22 pages.

(56) References Cited

OTHER PUBLICATIONS

List of IBM Patents or Patent Applications Treated as Related; Appendix P; Date Filed May 20, 2021; 2 Pages.
Utz Bacher et al., "Secure Storage Query and Donation", U.S. Appl. No. 17/321,869, filed May 17, 2021.
Claudio Imbrenda et al., "Host Virtual Address Space for Secure Interface Control Storage", U.S. Appl. No. 17/475,757 filed with the USPTO on Sep. 15, 2021.
List of IBM Patents or Patent Applications Treated as Related; Appendix P; Date Filed Sep. 21, 2021; 2 Pages.

\* cited by examiner

HOST VIRTUAL ADDRESS SPACE FOR SECURE INTERFACE CONTROL STORAGE

BACKGROUND

The present invention relates generally to computer technology, and more specifically, to using host virtual address space for secure interface control storage.

Cloud computing and cloud storage provides users with capabilities to store and process their data in third-party data centers. Cloud computing facilitates the ability to provision a VM for a customer quickly and easily, without requiring the customer to purchase hardware or to provide floor space for a physical server. The customer may easily expand or contract the VM according to changing preferences or requirements of the customer. Typically, a cloud computing provider provisions the VM, which is physically resident on a server at the provider's data center. Customers are often concerned about the security of data in the VM, particularly since computing providers often store more than one customer's data on the same server. Customers may desire security between their own code/data and the cloud computing provider's code/data, as well as between their own code/data and that of other VMs running at the provider's site. In addition, the customer may desire security from the provider's administrators as well as against potential security breaches from other code running on the machine.

To handle such sensitive situations, cloud service providers may implement security controls to ensure proper data isolation and logical storage segregation. The extensive use of virtualization in implementing cloud infrastructure results in unique security concerns for customers of cloud services as virtualization alters the relationship between an operating system (OS) and the underlying hardware, be it computing, storage, or even networking hardware. This introduces virtualization as an additional layer that itself must be properly configured, managed and secured.

In general, a VM, running as a guest under the control of a host hypervisor, relies on that hypervisor to transparently provide virtualization services for that guest. These services include memory management, instruction emulation, and interruption processing.

In the case of memory management, the VM can move (page-in) its data from a disk to be resident in memory and the VM can also move its data back out (page-out) to the disk. While the page is resident in memory, the VM (guest) uses dynamic address translation (DAT) to map the pages in memory from a guest virtual address to a guest absolute address. In addition, the host hypervisor has its own DAT mapping (from host virtual address to host absolute address) for the guest pages in memory and it can, independently and transparently to the guest, page the guest pages in and out of memory. It is through the host DAT tables that the hypervisor provides memory isolation or sharing of guest memory between two separate guest VMs. The host is also able to access the guest memory to simulate guest operations, when necessary, on behalf of the guest.

SUMMARY

According to one or more embodiments of the present invention, a computer implemented method includes receiving, at a secure interface control of a computer system, an access request for a data structure related to a secure entity in a secure domain of the computer system. The secure interface control can check for a virtual storage address associated with a location of the data structure. The secure interface control can request an address translation using a virtual address space of a non-secure entity of the computer system based on determining that the location of the data structure is associated with the virtual storage address. The secure interface control can access the data structure based on a result of the address translation. Advantages can include providing host virtual address space for secure interface control storage.

In accordance with additional or alternative embodiments of the present invention, the secure interface control can access the data structure using an absolute address based on a determining that the location of the data structure is not associated with the virtual storage address. Advantages can include addressing flexibility for absolute addressing.

In accordance with additional or alternative embodiments of the present invention, a mapping of the virtual storage address provided by the non-secure entity can be verified. Advantages can include checking the integrity of data managed by a non-secure entity for a secure entity.

In accordance with additional or alternative embodiments of the present invention, verifying the mapping of the virtual storage address can include checking for a change in the mapping compared to a previous mapping. Advantages can include confirming that a non-secure entity does not modify address mapping for a secure entity.

In accordance with additional or alternative embodiments of the present invention, the data structure related to the secure entity in the secure domain can be distributed between a plurality of pages of memory. Advantages can include supporting data structure fragmentation.

In accordance with additional or alternative embodiments of the present invention, the pages of memory donated by the non-secure entity can reside at a contiguous range of virtual addresses. Advantages can include making fragmented absolute addresses appear contiguous.

In accordance with additional or alternative embodiments of the present invention, checking for the virtual storage address can further include inspecting a zone-security table to determine whether a virtual address compare associated with a host virtual address is enabled or disabled. Advantages can include managing addressing mode options per domain or page.

In accordance with additional or alternative embodiments of the present invention, the secure interface control can be firmware, hardware, trusted software, or a combination of firmware, hardware, and trusted software. Advantages can include implementing the secure interface control with low associated operating impact to overall system performance.

In accordance with additional or alternative embodiments of the present invention, the non-secure entity can be a hypervisor configured to host one or more secure guests as the secure entity. Advantages can include hosting secure guests by a non-secure hypervisor.

Other embodiments of the present invention implement the features of the above-described methods in computer systems and in computer program products.

Additional features and advantages are realized through the techniques of the present disclosure. Other embodiments and aspects of the invention are described in detail herein and are considered a part of the invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
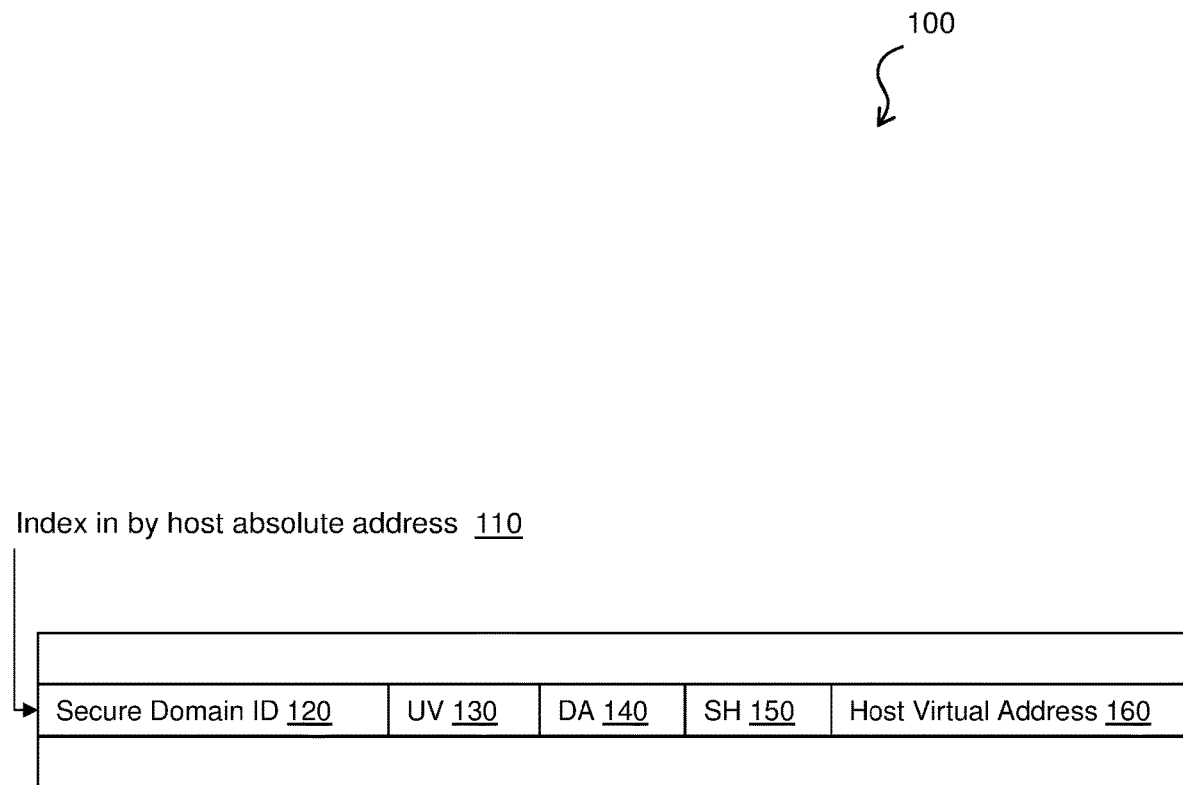
FIG. 1 depicts a table for zone security according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention leverage an efficient, lightweight secure interface control between the software and the machine to provide additional security.

A virtual machine (VM), running as a guest under the control of a host hypervisor, relies on that hypervisor to transparently provide virtualization services for that guest. These services can apply to any interface between a secure entity and another untrusted entity that traditionally allows access to the secure resources by this other entity. As mentioned previously, these services can include, but are not limited to memory management, instruction emulation, and interruption processing. For example, for interrupt and exception injection, the hypervisor typically reads and/or writes into a prefix area (low core) of the guest. The term "virtual machine" or "VM" as used herein refers to a logical representation of a physical machine (computing device, processor, etc.) and its processing environment (operating system (OS), software resources, etc.). The VM is maintained as software that executes on an underlying host machine (physical processor or set of processors). From the perspective of a user or software resource, the VM appears to be its own independent physical machine. The terms "hypervisor" and "VM Monitor (VMM)" as used herein refer to a processing environment or platform service that manages and permits multiple VM's to execute using multiple (and sometimes different) OS's on a same host machine. It should be appreciated that deploying a VM includes an installation process of the VM and an activation (or starting) process of the VM. In another example, deploying a VM includes an activation (or starting) process of the VM (e.g., in case the VM is previously installed or already exists).

In order to facilitate and support secure guests, a technical challenge exists where additional security is required between the hypervisor and the secure guests without relying on the hypervisor, such that the hypervisor cannot access data from the VM, and hence, cannot provide services in the way described above The secure execution described herein provides a hardware mechanism to guarantee isolation between secure storage and non-secure storage as well as between secure storage belonging to different secure users. For secure guests, additional security is provided between the "untrusted" non-secure hypervisor and the secure guests. In order to do this, many of the functions that the hypervisor typically does on behalf of the guests need to be incorporated into the machine. A new secure interface control, also referred to herein as "UV", is described herein to provide a secure interface between the hypervisor and the secure guests. The terms secure interface control and UV are used interchangeably herein. The secure interface control works in collaboration with the hardware to provide this additional security. In addition, a lower level hypervisor may be providing virtualization for this untrusted hypervisor, and if the lower level hypervisor is implemented in trusted code/software, it can also be part of the secure interface control.

The secure interface control, in one example, is implemented in internal, secure, and trusted hardware and/or firmware. This trusted firmware can include, for example, processor millicode or PR/SM logical partitioning code. For a secure guest or entity, the secure interface control provides the initialization and maintenance of the secure environment as well as the coordination of the dispatch of these secure entities on the hardware. While the secure guest is actively using data and it is resident in host storage, it is kept "in the clear" in secure storage. Secure guest storage can be accessed by that single secure guest—this being strictly enforced by the hardware. That is, the hardware prevents any non-secure entity (including the hypervisor or other non-secure guests) or different secure guest from accessing that data. In this example, the secure interface control runs as a trusted part of the lowest levels of firmware. The lowest level, or millicode, is really an extension of the hardware and is used to implement the complex instructions and functions defined for example in zArchitecture® from IBM. Millicode has access to all parts of storage, which in the context of secure execution, includes its own secure UV storage, non-secure hypervisor storage, secure guest storage, and shared storage. This allows it to provide any function needed by the secure guest or by the hypervisor in support of that guest. The secure interface control also has direct access to the hardware which allows the hardware to efficiently provide security checks under the control of conditions established by the secure interface control.

In accordance with one or more embodiments of the present invention, a secure-storage bit is provided in the hardware to mark a secure page. When this bit is set, the hardware prevents any non-secure guest or hypervisor from accessing this page. In addition, each secure or shared page is registered in a zone-security table and is tagged with a secure-guest-domain identification (ID). When the page is non-secure it is marked as such in the zone-security table. This zone-security table is maintained by the secure interface control per partition or zone. There is one entry per host absolute page which is used by the hardware on any DAT translation made by a secure entity to verify that the page is only accessed by the secure guest or entity that owns it.

In accordance with one or more embodiments of the present invention, the secure interface control has its own secure UV storage which can only be accessed by the secure interface control itself. This storage is used by the secure interface control and the hardware to provide the needed security for the secure guests. The secure interface control uses this secure storage to store information about itself, the zone enabled to run secure guests, the secure guests, and the secure virtual CPUs. Secure interface control storage, similar to secure guest storage, is also marked as a secure page to prevent access by any non-secure entity. In addition, secure interface control storage has its own secure-domain IDs that are used to prevent any other secure entities from accessing secure interface control storage.

One or more embodiments of the present invention use host virtual address space for secure interface control storage. Areas of memory for storing information about the secure interface control, guests, and virtual CPUs are typically located in absolute memory, meaning that the secure interface control can access the areas of memory directly without address translation. In order to allow for secure swapping, a data structure, such as an integrity table, can be created, maintained and used in areas of memory donated from the host to the secure interface control. The integrity table can hold a checksum of the content of each page and related information as pages are swapped out to disk, so the content of the page can be checked once the page is swapped back in. The size of the integrity table can depend on the size of the storage of a secure guest and may span large areas of memory. The integrity table and other data structures of the secure interface control can be allocated at runtime and may need to appear as contiguous memory per data structure. Once a system has been running for some time, it can become challenging to find a large contiguous area of storage due to memory fragmentation. One or more embodiments of the present invention provide a workaround to memory fragmentation issues by allowing allocation of large contiguous areas of storage for the secure interface control even when the system has been running for some time. Rather than limiting the secure interface control to only address memory as absolute addresses, the secure interface control can use virtual storage in the address space of an untrusted hypervisor to store one or more data structures, such as an integrity table. This can enable the secure interface control to use the dynamic-address-translation (DAT) to access structures in host virtual address space for secure interface control storage.

In accordance with one or more embodiments of the present invention, the software uses a UV Call (UVC) instruction to request the secure interface control to perform a specific action. For example, the UVC instruction can be used by the hypervisor to initialize the secure interface control, create the secure guest domain (e.g., secure guest configuration), and create the virtual CPUs within that secure configuration. It can also be used to import (decrypt and assign to secure guest domain) and export (encrypt and allow host access to) a secure guest page as part of the hypervisor page-in or page-out operations. In addition, the secure guest has the ability to define storage shared with the hypervisor, make secure-storage shared, and make shared-storage secure.

These UVC commands can be executed by the machine firmware similarly to many other architected instructions. The machine does not enter a secure interface control mode but instead the machine performs secure interface control functions in the mode in which it is currently running. The hardware maintains both the firmware and software states so there is no switch of contexts in order to handle these operations. This low overhead allows for closely-tied cooperation between the different layers of the software, trusted firmware, and hardware in a way that minimizes and reduces complexity in the secure interface control while still providing the necessary level of security.

In accordance with one or more embodiments of the present invention, in support of the control block structures needed by the secure interface control and the hardware to properly maintain the secure guest and supporting hypervisor environments, the hypervisor donates storage to the secure interface control while initializing the secure guest environment. As a result, in preparation for 1) initializing a zone to run secure guests, 2) creating secure guest domains, and 3) creating the secure CPUs running in each of the domains, the hypervisor issues a query UVC instruction to determine, among other things, the amount of storage needed for donation. Once the storage has been donated, it is marked as secure and registered as belonging to the secure interface control; and access by any non-secure or secure guest entity is prohibited. This remains the case until the time when the associated entity (e.g., secure guest CPU, secure guest domain or zone) is destroyed.

In one example, the first section of UV storage, to support the zone-specific UV control blocks, is donated to the secure interface control as part of the initialize UVC and resides in what is referred to herein as UV2 storage. The second and third sections of UV storage, to support the base and variable secure-guest-configuration control blocks (for each secure guest domain), are donated as part of the create-secure-guest-configuration UVC and reside in UVS and UVV storage, respectively. The fourth and final section of UV storage, to support the secure-CPU control blocks, also reside in UVS space and are donated as part of the create-secure-guest-CPU UVC. As each of these areas are donated, the secure control interface marks them as secure (to prevent them from being accessed by any non-secure entity) and also registers them in the zone-security table as belonging to the secure interface control (to prevent them from being accessed by any secure guest entities). To provide further isolation within UV space, UV2 space (which is not associated with any specific secure-guest domain) is also tagged with a unique UV2 secure domain while UVS and UVV space are both further tagged with the associated specific secure-guest domain. In this example, UVV space resides in host virtual space and, therefore, can be further identified with a host virtual to host absolute mapping.

Although the secure interface control has access to all of storage (non-secure storage, secure guest storage and UV storage), one or more embodiments of the present invention provide mechanisms that allow the secure interface control to access UV storage very specifically. Using the same hardware mechanisms which provide isolation between secure guest domains, embodiments of the present invention can provide similar isolation within the UV storage. This guarantees that the secure interface control only accesses UV storage when intended and specified; only accesses secure guest storage for the specified secure guest desired; and only accesses non-secure storage when specified. That is, the secure interface control may very explicitly specify the storage it intends to access so that hardware can guarantee that it does indeed access that storage. In addition, it can further specify that it only intends to access UV storage associated with the specified secure guest domain.

To provide security, when the hypervisor is transparently paging the secure guest data in and out, the secure interface control, working with the hardware, provides and guarantees the decryption and encryption of the data. In order to accomplish this, the hypervisor is required to issue new UVCs when paging the guest secure data in and out. The hardware, based on controls setup by the secure interface control during these new UVCs, will guarantee that these UVCs are indeed issued by the hypervisor.

In this new secure environment, whenever the hypervisor is paging-out a secure page, it is required to issue a new convert from secure storage (export) UVC. The secure interface control, in response to this export UVC, will 1) indicate that the page is "locked" by the UV, 2) encrypt the page, 3) set the page to non-secure, and, 4) reset the UV lock. Once the export UVC is complete, the hypervisor can now page-out the encrypted guest page.

In addition, whenever the hypervisor is paging-in a secure page, it must issue a new convert to secure storage (import) UVC. The UV, or secure interface control, in response to this import UVC, will 1) mark the page as secure in the hardware, 2) indicate that the page is "locked" by the UV, 3) decrypt the page, 4) set authority to a particular secure guest domain, and 5) reset the UV lock. Whenever an access is made by a secure entity, the hardware performs authorization checks on that page during translation. These checks include 1) a check to verify that the page does indeed belong to the secure guest domain which is trying to access it and 2) a check to make sure the hypervisor has not changed the host mapping of this page while this page has been resident in guest memory. Once a page is marked as secure, the hardware prevents access to any secure page by either the hypervisor or by a non-secure guest VM. The additional translation steps prevent access by another secure VM and prevent remapping by the hypervisor.

Turning now to FIG. 1, a table 100 for zone security is generally shown in accordance with one or more embodiments of the present invention. The zone-security table 100 shown in FIG. 1 is maintained by the secure interface control and is used by the secure interface control and hardware to guarantee secure access to any page accessed by a secure entity. The zone-security table 100 is indexed by the host absolute address 110. That is, there is one entry for each page of host absolute storage. Each entry includes information that is used to verify the entry as belonging to the secure entity making the access.

Further, as shown in FIG. 1, the zone-security table 100 includes a secure domain ID 120 (identifies the secure domain associated with this page); a UV-bit 130 (indicates that this page was donated to the secure interface control and is owned by the secure interface control); a disable address compare (DA)-bit 140 (used to disable the host address pair compare in certain circumstances such as when a secure interface control page that is defined as host absolute does not have an associated host virtual address); a shared (SH)-bit 150 (indicates that the page is shared with the non-secure hypervisor) and a host virtual address 160 (indicates the host virtual address registered for this host absolute address, which is referred to as the host-address pair). Note that a host-address pair indicates a host absolute and associated, registered host virtual address. The host-address pair represents the mapping of this page, once imported by the hypervisor, and the comparison guarantees that the host does not remap that page while it is being used by the guest.

Dynamic address translation (DAT) is used to map virtual storage to real storage. When a guest VM is running as a pageable guest under the control of a hypervisor, the guest uses DAT to manage pages resident in its memory. In addition, the host, independently, uses DAT to manage those guest pages (along with its own pages) when the pages are resident in its memory. The hypervisor uses DAT to provide isolation and/or sharing of storage between different VMs as well as to prevent guest access to hypervisor storage. The hypervisor has access to all of the guests' storage when guests are running in a non-secure mode.

DAT enables isolation of one application from another while still permitting them to share common resources. Also, it permits the implementation of VMs, which may be used in the design and testing of new versions of OSs along with the concurrent processing of application programs. A virtual address identifies a location in virtual storage. An address space is a consecutive sequence of virtual addresses, together with the specific transformation parameters (including DAT tables) which allow each virtual address to be translated to an associated absolute address which identifies that address with a byte location in storage.

DAT uses a multi-table lookup to translate the virtual address to the associated absolute address. This table structure is typically defined and maintained by a storage manager. This storage manager transparently shares the absolute storage between multiple programs by paging out one page, for example, to bring in another page. When the page is paged-out, the storage manager will set an invalid bit in the associated page table, for example. When a program tries to access a page that was paged-out, the hardware will present a program interruption, often referred to as a page fault, to the storage manager. In response, the storage manager will page-in the requested page and reset the invalid bit. This is all done transparent to the program and allows the storage manager to virtualize the storage and share it among various different users.

When a virtual address is used by a CPU to access main storage, it is first converted, by means of DAT, to a real address, and then, by means of prefixing, to an absolute address. The designation (origin and length) of the highest-level table for a specific address space is called an address-space-control element (ASCE) and defines the associated address space.

Figure 2:
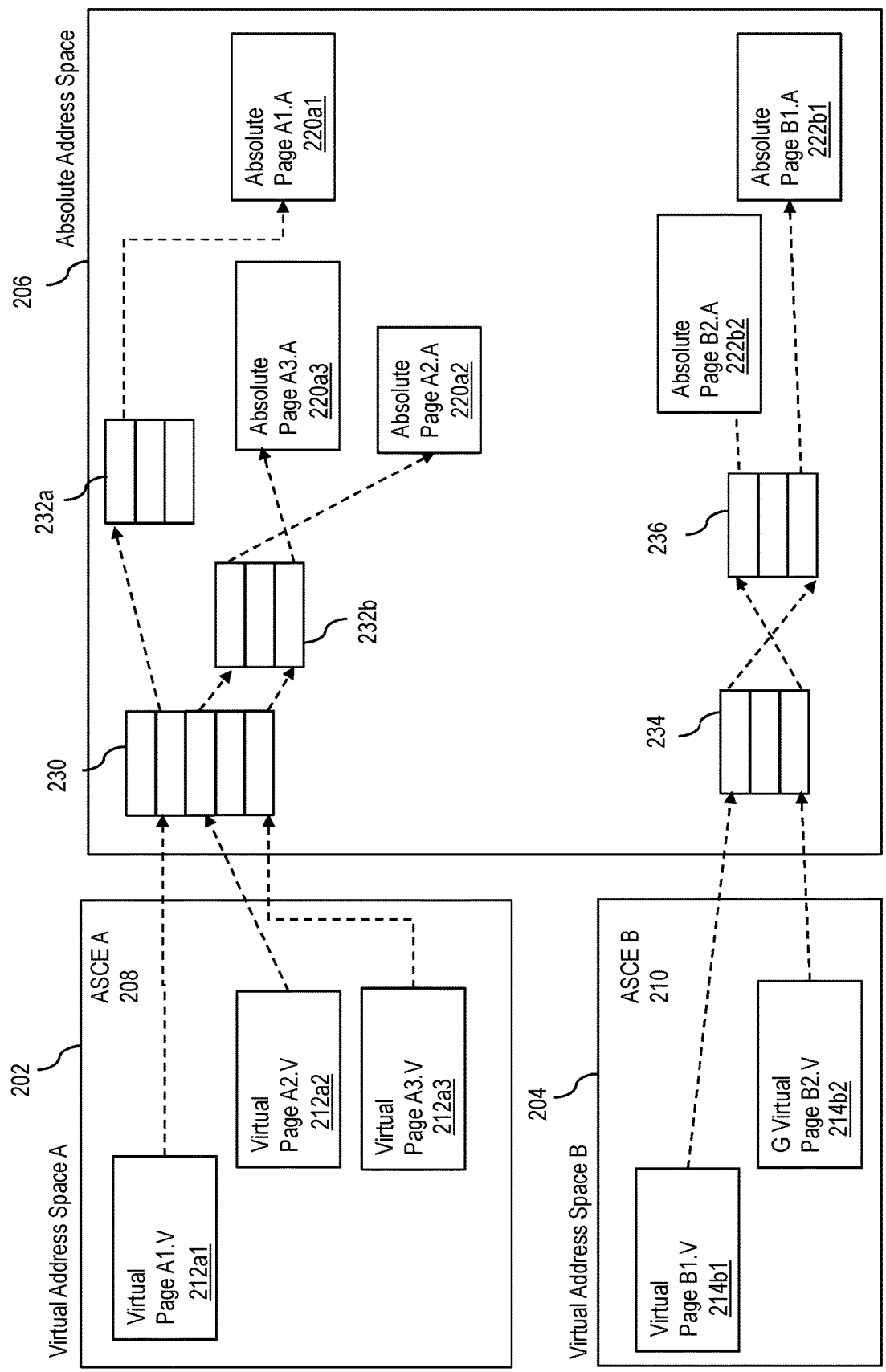
FIG. 2 depicts virtual and absolute address spaces for performing DAT according to one or more embodiments of the present invention.

Turning now to FIG. 2, example virtual address spaces 202 and 204 and an absolute address space 206 for performing DAT are generally shown in accordance with one or more embodiments of the present invention. In the example shown in FIG. 2, there are two virtual address spaces: virtual address space 202 (defined by address space control element (ASCE) A 208) and virtual address space 204 (defined by ASCE B 210). Virtual pages A1.V 212a1, A2.V 212a2, and A3.V 212a3 are mapped, by the storage manager in a multi-table (segment 230 & page tables 232a, 232b) lookup, using ASCE A 208, to absolute pages A1.A 220a1, A2.A 220a2 and A3.A 220a3. Similarly, virtual pages B1.V 214b1 and B2.V 214b2 are mapped in a two-table 234 & 236 lookup, using ASCE B 210, to absolute pages B1.A 222b1 and B2.A 222b2, respectively.

Figure 3:
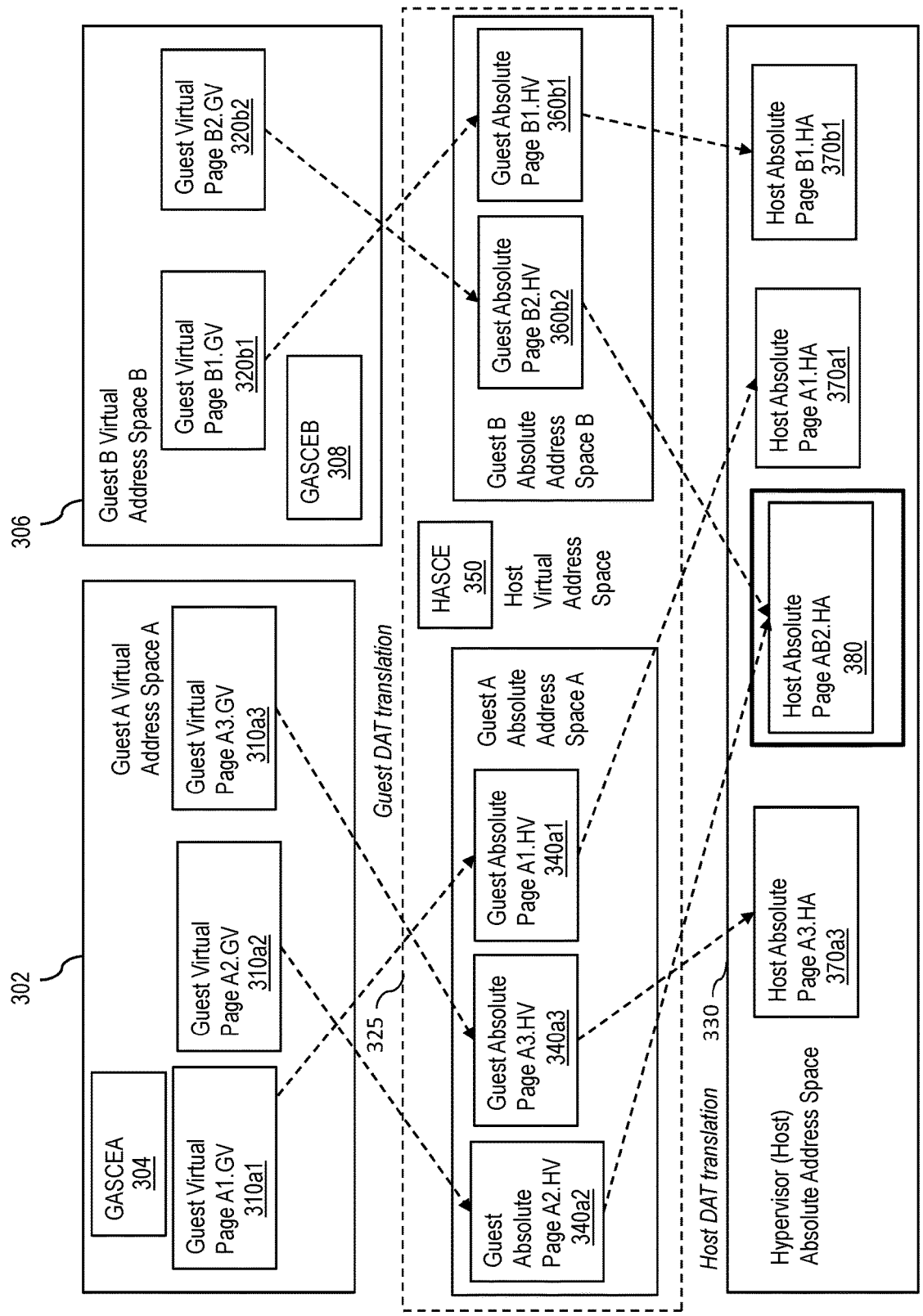
FIG. 3 depicts a nested, multi-part DAT to support a virtual machine (VM) running under a hypervisor according to one or more embodiments of the present invention.

Turning now to FIG. 3, an example of a nested, multi-part DAT translation used to support a VM running under a hypervisor is generally shown in accordance with one or more embodiments of the present invention. In the example shown in FIG. 3, guest A virtual address space A 302 (defined by guest ASCE (GASCE) A 304) and guest B virtual address space B 306 (defined by GASCEB 308) both reside in a shared host (hypervisor) virtual address space 325. As shown, virtual page A1.GV 310a1, A2.GV 310a2, and A3.GV 310a3, belonging to guest A, are mapped, by the guest A storage manager, using GASCEA 304 to guest absolute pages A1.HV 340a1, A2.HV 340a2, and A3.HV 340a3, respectively; virtual page B1.GV 320b1 and B2.GV 320b2, belonging to guest B, are mapped, independently by the guest B storage manager, using GASCEB 308 to guest absolute pages B1.HV 360b1 and B2.HV 360b2, respectively. In this example, these guest absolute pages map directly into the shared host virtual address space 325 and subsequently go through an additional host DAT translation to a host absolute address space 330. As shown, host virtual addresses A1.HV 340a1, A3.HV 340a3, and B1.HV 360b1 are mapped, by the host storage manager using host ASCE (HASCE) 350 to A1.HA 370a1, A3.HA 370a3, and B1.HA 370b1. Host virtual address A2.HV 340a2, belonging to guest A, and B2.HV 360b2, belonging to guest B, are both mapped to the same host absolute page AB2.HA 380. This enables data to be shared between these two guests. During the guest DAT translation, each of the guest table addresses is treated as a guest absolute and undergoes an additional, nested host DAT translation.

Embodiments of the present invention described herein provide secure guest and UV storage protection. Access to secure storage by non-secure guests and the hypervisor is prohibited. The hypervisor provides that, for a given resident secure guest page, the following occurs. The associated host absolute address is only accessible through a single hypervisor (host) DAT mapping. That is, there is a single host virtual address that maps to any given host absolute address assigned to a secure guest. The hypervisor DAT mapping (host virtual to host absolute) associated with a given secure guest page does not change while it is paged-in. The host absolute page associated with a secure guest page is mapped for a single secure guest.

Sharing of storage between secure guests is also prohibited according to one or more embodiments of the present invention. Storage is shared between a single secure guest and the hypervisor under control of the secure guest. UV storage is secure storage and is accessible by the secure interface control but not the guests/hosts. Storage is allocated to the secure interface control by the hypervisor. According to one or more embodiments of the present invention, any attempted violation of these rules is prohibited by the hardware and secure interface control.

Figure 4:
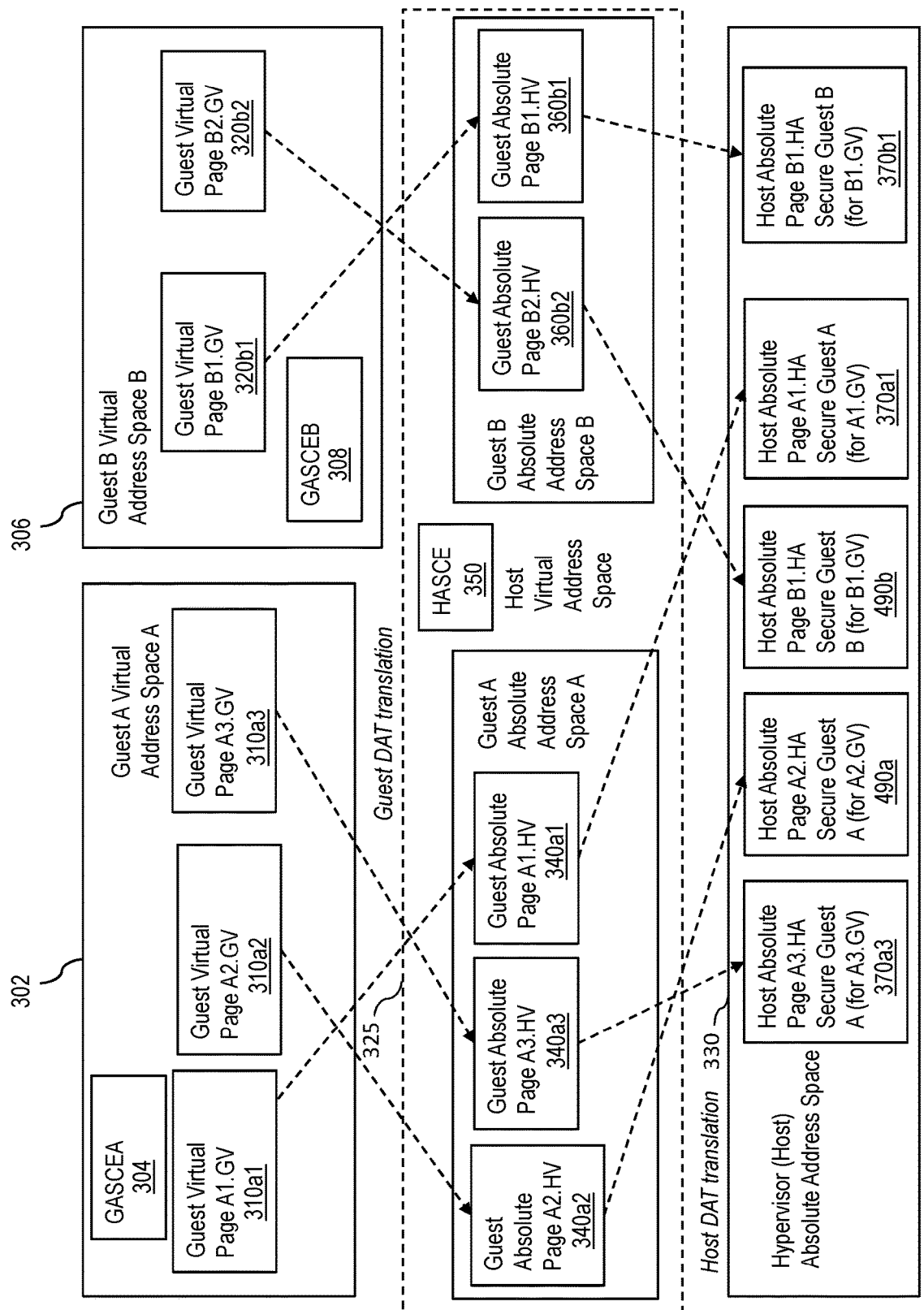
FIG. 4 depicts a mapping of secure guest storage according to one or more embodiments of the present invention.

Turning now to FIG. 4, an example of mapping of secure guest storage is generally shown in accordance with one or more embodiments of the present invention. FIG. 4 resembles FIG. 3, except that the example of FIG. 4 does not allow for sharing of storage between secure guest A and secure guest B. In the non-secure example of FIG. 3, both host virtual address A2.HV 340a2, belonging to guest A, and B2.HV 360b2, belonging to guest B, are mapped to the same host absolute page AB2.HA 380. In the secure guest storage example of FIG. 4, host virtual address A2.HV 340a2, belonging to guest A, maps to host absolute address A2.HA 490a, whereas B2.HV 360b2, belonging to guest B, maps to its own B2.HA 490b. In this example, there is no sharing between secure guests.

While the secure guest page resides on disk, it is encrypted. When the hypervisor pages-in a secure guest page, it issues a UV Call (UVC), which causes the secure interface control to mark the page as secure (unless shared), decrypt it (unless shared), and register it (in the zone-security table) as belonging to the appropriate secure guest (guest A, for example). In addition, it registers the associated host virtual address (A3.HV 340a3, for example) to that host absolute page (referred to as host-address pair). If the hypervisor fails to issue the correct UVC, it receives an exception when trying to access the secure guest page. When the hypervisor pages out a guest page, a similar UVC is issued which encrypts the guest page (unless shared) before marking the guest page as non-secure and registering it in the zone-security table as non-secure.

In an example having five given host absolute pages K, P, L, M, and N, each of the host absolute pages are marked as secure by the secure interface control when the hypervisor pages them in. This prevents non-secure guests and the hypervisor from accessing them. Host absolute pages K, P, and M are registered as belonging to guest A when the hypervisor pages them in; host absolute pages L and N are registered to guest B when paged-in by the Hypervisor. Shared pages, pages shared between a single secure guest and the hypervisor, are not encrypted or decrypted during paging. They are not marked as secure (allows access by hypervisor) but are registered with a single secure guest domain in the zone-security table.

In accordance with one or more embodiments of the present invention, when a non-secure guest or the hypervisor tries to access a page that is owned by a secure guest, the hypervisor receives a secure-storage access (PIC3D) exception. No additional translation step is required to determine this.

In accordance with one or more embodiments, when a secure entity tries to access a page, the hardware performs an additional translation check that verifies that the storage does indeed belong to that particular secure guest. If not, a non-secure access (PIC3E) exception is presented to the hypervisor. In addition, if the host virtual address being translated does not match the host virtual address from the registered host-address pair in the zone-security table, a secure-storage violation ('3F'x) exception is recognized. To enable sharing with the hypervisor, a secure guest may access storage that is not marked as secure as long as the translation checks allow for access.

Figure 5:
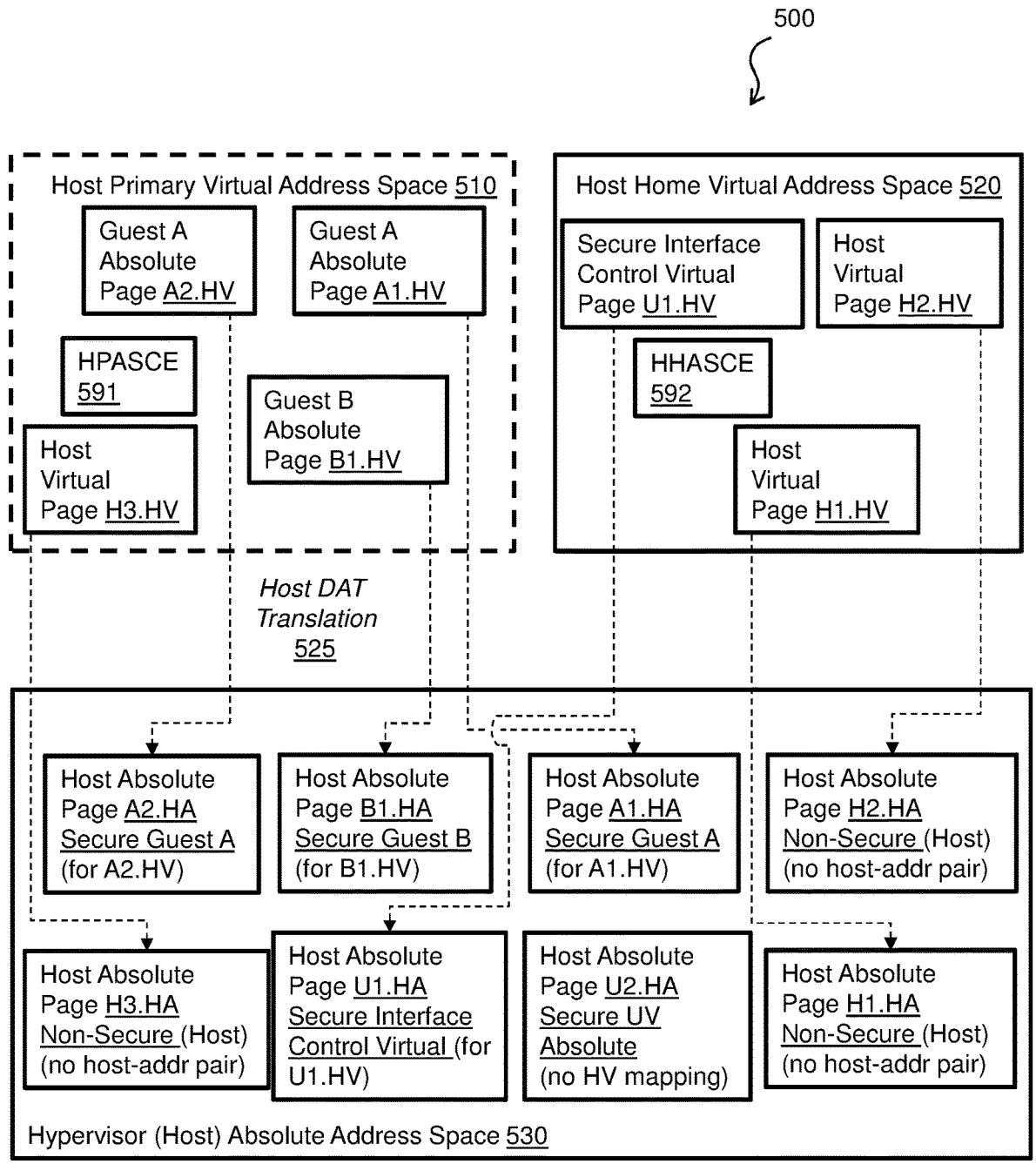
FIG. 5 depicts a system schematic of a dynamic address translation (DAT) operation according to one or more embodiments of the present invention.

Turning now to FIG. 5, a system schematic 500 of a DAT operation is generally shown in accordance with one or more embodiments of the present invention. The system schematic 500 includes a host primary virtual address space 510 and a host home virtual address space 520, from which pages are translated (e.g., see host DAT translation 525; note that the dotted lines represent mapping through the DAT translation 525) to a hypervisor (host) absolute address space 530. For instance, FIG. 5 illustrates the sharing of host absolute storage by two different host virtual address spaces and also the sharing of one of those host virtual addresses between not only two guests but, in addition, with the host itself. In this regard, the host primary virtual address space 510 and the host home virtual address space 520 are examples of two host virtual address spaces, each of which is addressed by a separate ASCE, the host primary ASCE (HPASCE) 591 and host home ASCE (HHASCE) 592, respectively. Note that all secure interface control storage (both virtual and real) is donated by the hypervisor and marked as secure. Once donated, the secure interface control storage can only be accessed by the secure interface control for as long as an associated secure entity exists.

As illustrated, the host primary virtual address space 510 includes a Guest A absolute page A1.HV, a Guest A absolute page A2.HV, a guest B absolute page B1.HV, and a host virtual page H3.HV. The host home virtual address space 520 includes a secure-interface-control virtual page U1.HV, a host virtual page H1.HV, and a host virtual page H2.HV.

In accordance with one or more embodiments of the present invention, all secure guest (e.g., secure Guest A & secure Guest B) storage is registered, in the zone-security table described herein, as belonging to a secure guest configuration, and the associated host virtual address (e.g., A1.HV, A2.HV, B1.HV) is also registered as part of a host-address pair. In one or more embodiments, all secure guest storage is mapped in the host primary virtual space. In addition, all secure interface control storage is registered, also in the zone-security table, as belonging to the secure interface control and may be further differentiated in the zone-security table based on the associated secure guest domain. In accordance with one or more embodiments of the present invention, UV virtual storage is mapped in host home virtual space and the associated host virtual address is registered as part of the host-address pair. In accordance with one or more embodiments, UV real storage does not have an associated host virtual mapping, and the DA bit in the zone-security table (which indicates that the virtual address comparison is disabled) is set to indicate this. Host storage is marked as non-secure and is also registered in the zone-security table as non-secure.

Thus, in the case where 'guest absolute=host virtual,' the hypervisor (host) primary DAT tables (defined by the HPASCE 591) translate the pages of the host primary virtual address space 510 as follows: the Guest A Absolute Page A1.HV is mapped to a Host Absolute A1.HA belonging to Secure Guest A; the Guest A Absolute Page A2.HV is mapped to a Host Absolute A2.HA belonging to Secure Guest A; the Guest B Absolute Page B1.HV is mapped to a Host Absolute B1.HA belonging to Secure Guest B; and the Host Virtual Page H3.HV is mapped to a Host Absolute Page H3.HA Non-Secure Host (and there is no host-address pair since it is non-secure). Further, the hypervisor (host) home DAT tables (defined by the HHASCE 592) translate the pages of the host home virtual address space 520 as follows: the Secure Interface Control Virtual Page U1.HV is mapped to a Host Absolute Page U1.HA defined as Secure UV Virtual; the Host Virtual Page H1.HV is mapped to a Host Absolute Page H1.HA defined as Non-Secure; and the Host Virtual Page H2.HV is mapped to a Host Absolute Page H2.HA defined as Non-Secure. There is no host-address pair associated with either H1.HA or H2.HA since they are non-secure.

In operation, if a secure guest tries to access a secure page assigned to the secure interface control, a secure-storage violation ('3F'X) exception is presented by the hardware to the hypervisor. If a non-secure guest or the hypervisor tries to access any secure page (including those assigned to the secure interface control), a secure-storage access ('3D'X) exception is presented by the hardware to the hypervisor. Alternatively, an error condition can be presented for attempted accesses made to secure interface control space. If the hardware detects a mismatch in the secure assignment (e.g., the storage is registered in the zone-security table as belonging to a secure guest rather than to the secure interface control, or there is mismatch in host-address pair being used with the registered pair) on a secure interface control access, a check is presented.

In other words, the host primary virtual address space 510 includes host virtual pages A1.HV and A2.HV (belonging to secure guest A) and B1.HV (belonging to secure guest B), which map to host absolute A1.HA, A2.HA, and B1.HA, respectively. In addition, the host primary virtual address space 510 includes host (hypervisor) page H3.HV, which maps to host absolute H3.HA. The host home virtual space 520 includes two host virtual pages H1.HV and H2.HV, which map into host absolute pages H1.HA and H2.HA. Both the host primary virtual address space 510 and the host home virtual address space 520 map into the single host absolute 530. The storage pages belonging to secure guest A and secure guest B are marked as secure and registered in the zone-security table 100 shown in FIG. 1 with their secure domains and associated host virtual addresses. The host storage, on the other hand, is marked as non-secure. When the hypervisor is defining the secure guests, it must donate host storage to the secure interface control to use for secure control blocks needed in support of these secure guests. This storage can be defined in either host absolute or host virtual space and, in one example, specifically, in host home virtual space. Returning to FIG. 5, a host absolute pages U1.HA and U2.HA Secure UV Absolute is secure-interface-control storage that is defined as host absolute storage. As a result, these pages are marked as secure and registered in the zone-security table 100 shown in FIG. 1 as belonging to the secure interface control and with an associated secure domain. Since the pages are defined as host absolute addresses, there is no associated host virtual address so the DA-bit is set in the zone-security table 100.

Figure 6:
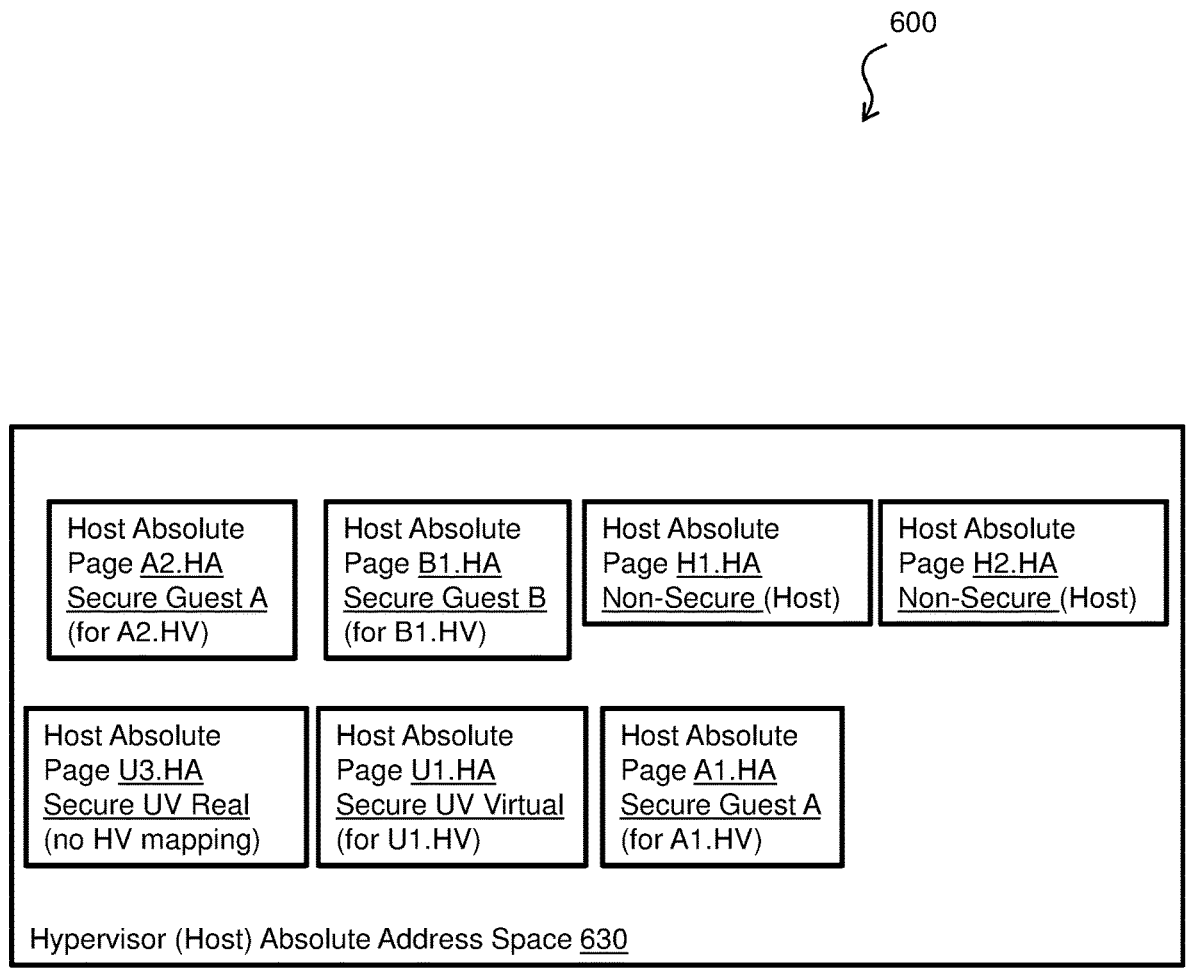
FIG. 6 depicts a system schematic of a secure interface control memory according to one or more embodiments of the present invention.

After the translation, an example of the Hypervisor (Host) Absolute Address Space 530 can be found in FIG. 6. The FIG. 6 a system schematic 600 regarding a secure interface control memory is depicted according to one or more embodiments of the present invention. The system schematic 600 illustrates a Hypervisor (Host) Absolute Address Space 630 including a Host Absolute Page A2.HA Secure Guest A (for A2.HV); a Host Absolute Page B1.HA Secure Guest B (for B1.HV); a Host Absolute Page H1.HA Non-Secure (Host); a Host Absolute Page H2.HA Non-Secure (Host); a Host Absolute Page U3.HA Secure UV Real (no HV mapping); a Host Absolute Page U1.HA Secure UV Virtual (for U1.HV); and a Host Absolute Page A1.HA Secure Guest A (for A1.HV).

Figure 7:
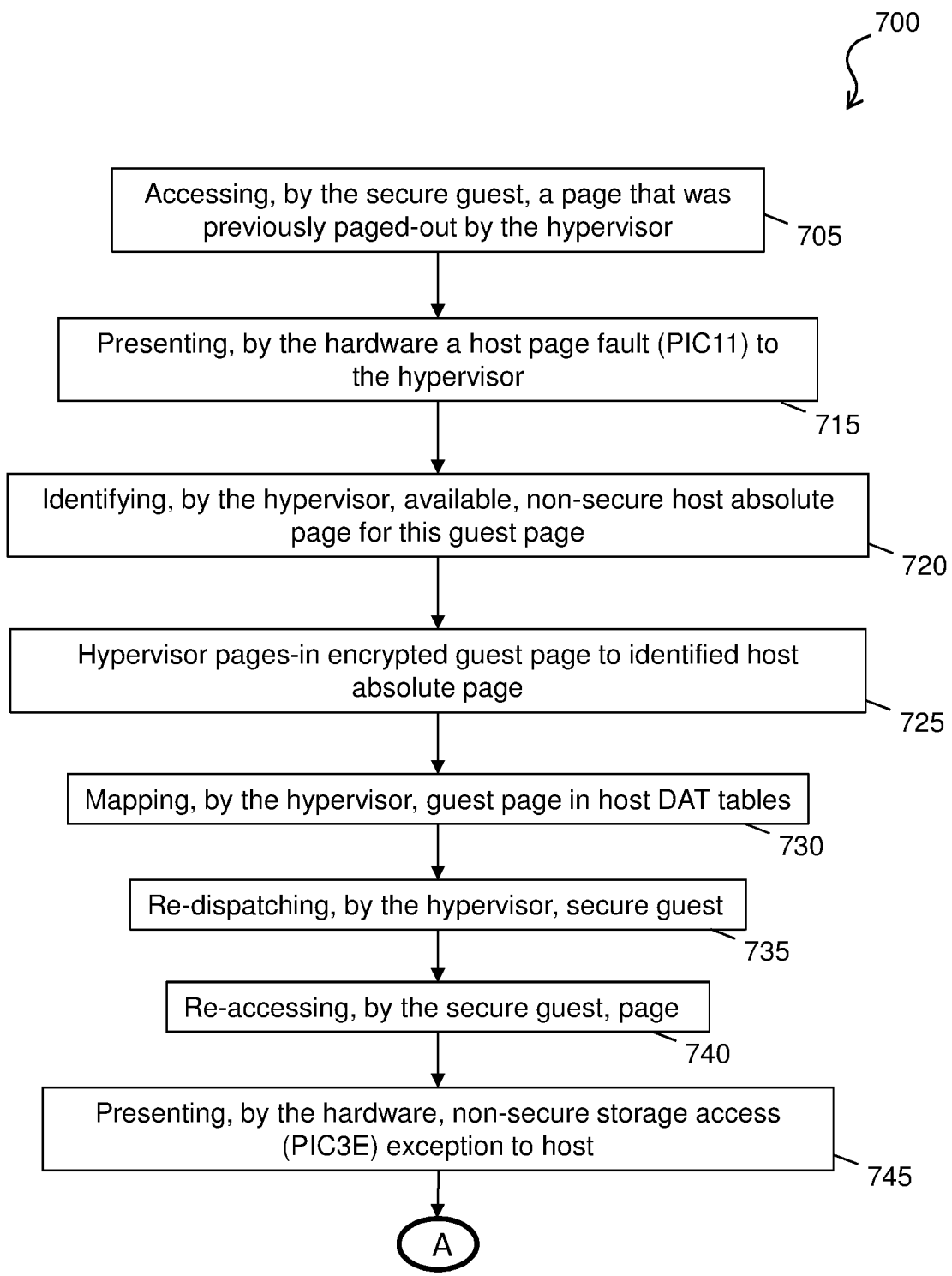
FIG. 7 depicts a process flow of an import operation according to one or more embodiments of the present invention.

Turning now to FIG. 7, a process flow 700 for an import operation is generally shown according to one or more embodiments of the present invention. When a secure guest accesses a page that was paged-out by the hypervisor, a sequence of events such as that shown in the process flow 700 occur in order to securely bring that page back in. The process flow 700 beings at block 705, where the secure guest accesses the guest virtual page. Since the page, for example, is invalid, the hardware presents a host page fault, indicated by program-interruption-code 11 (PIC11), to the hypervisor (see block 715). The hypervisor, in turn, identifies an available non-secure host absolute page for this guest page (see block 720) and pages-in the encrypted guest page to the identified host absolute page (see block 725).

At block 730, the host absolute page is then mapped in the appropriate (based on host virtual address) host DAT tables. At block 735, the hypervisor host then re-dispatches the secure guest. At block 740, the secure guest re-accesses the guest secure page. The page fault no longer exists but since this a secure guest access and the page is not marked as secure in the zone-security table 100 of FIG. 100 the hardware presents a non-secure-storage exception (PIC3E) to the hypervisor, at block 745. This PIC3E prevents access by the guest to this secure page until the necessary import has been issued. Next, the process flow 700 proceeds to "A", which is connected to FIG. 8.

Figure 8:
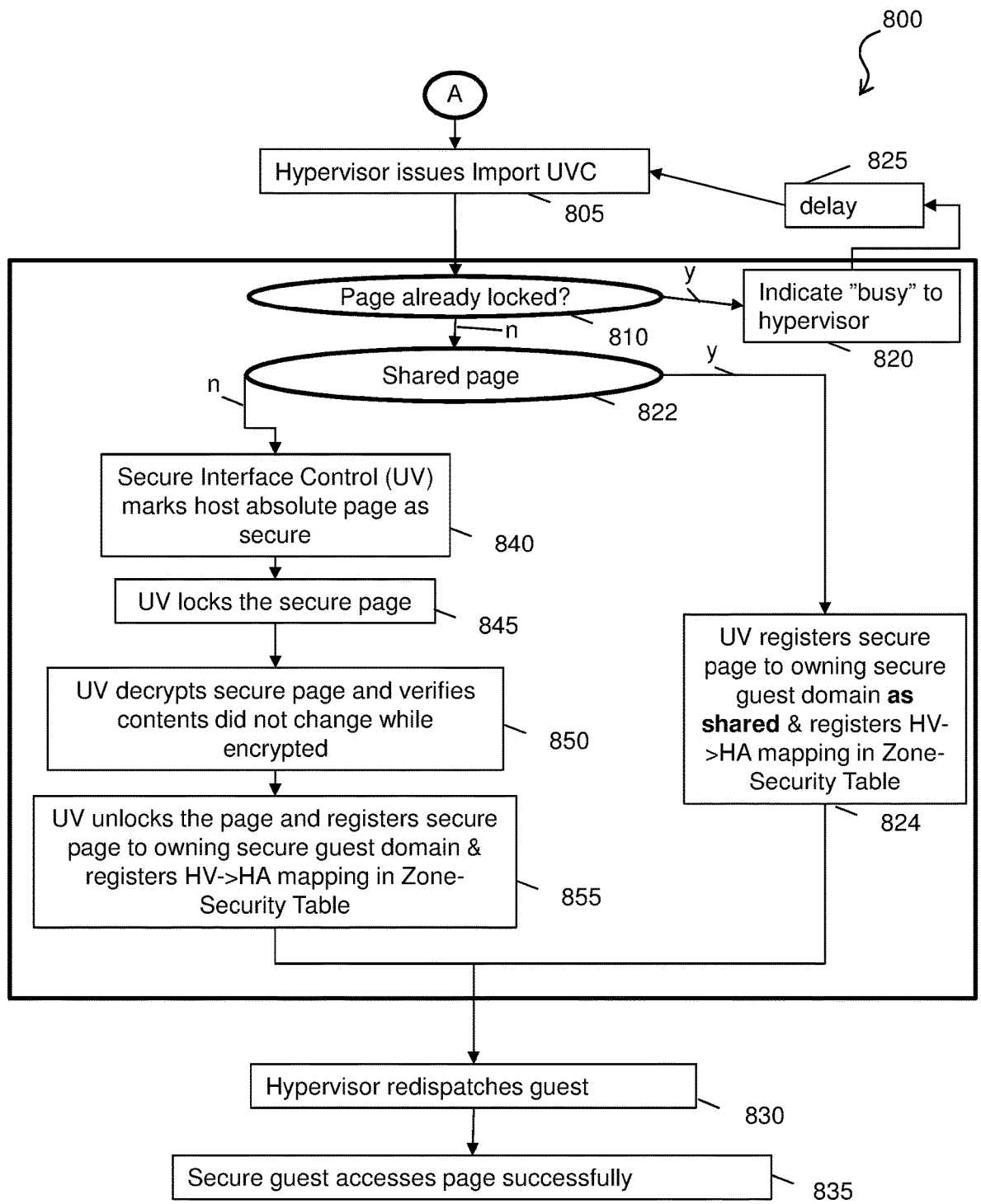
FIG. 8 depicts a process flow of an import operation according to one or more embodiments of the present invention.

Turning now to FIG. 8, a process flow 800 for performing an import operation is generally shown in accordance with one or more embodiments of the present invention. A well-behaved hypervisor (e.g., performing in an expected manner without errors), in response to the PIC3E, will issue an import UVC (see block 805). Note that at this point, a page to be imported is marked as non-secure and can only be accessed by the hypervisor, other non-secure entities, and the secure interface control. It cannot be accessed by secure guests.

As part of the import UVC, the trusted firmware acting as the secure interface control checks to see if this page is already locked by the secure interface control (see decision block 810). If it is, the process flow 800 proceeds to block 820. At block 820, a "busy" return code is returned to the hypervisor that will, in response, delay (see block 825) and reissue the Import UVC (the process flow 800 returns to block 805). If the page is not already locked then, the process flow 800 proceeds to decision block 822.

At decision block 822, the secure interface control checks to see if the page is a page which is shared with the non-secure hypervisor. If it is shared (the process flow 800 proceeds to decision block 824), the secure interface control registers the host absolute address in the zone-security table with the associated secure guest domain, host virtual address and as shared. This page remains marked as non-secure. This completes the import UVC and the page is now available to be accessed by the guest. Processing continues with the hypervisor re-dispatching guest (block 830) and the secure guest accessing the page successfully (block 835).

If the host virtual page to be imported is not shared with the hypervisor (the process flow 800 proceeds to block 840), the secure interface control will mark the page as secure, so that the hypervisor can no longer access the page. At block 845, the secure interface control locks the page, so that no other UVC can modify the page status. Once the lock is set (at block 850), the secure interface control will verify that the contents of the guest page did not change while it was encrypted. If they did change then an error return code is returned to the hypervisor, otherwise, the secure interface control will decrypt the secure page.

At block 855, the secure interface control unlocks the page, allowing access by other UVCs, registers the page in the zone-security table, as secure and associated with the appropriate guest domain and host virtual address to complete the host-address HV->HA pair. This allows access by the guest and completes the UVC.

Figure 9:
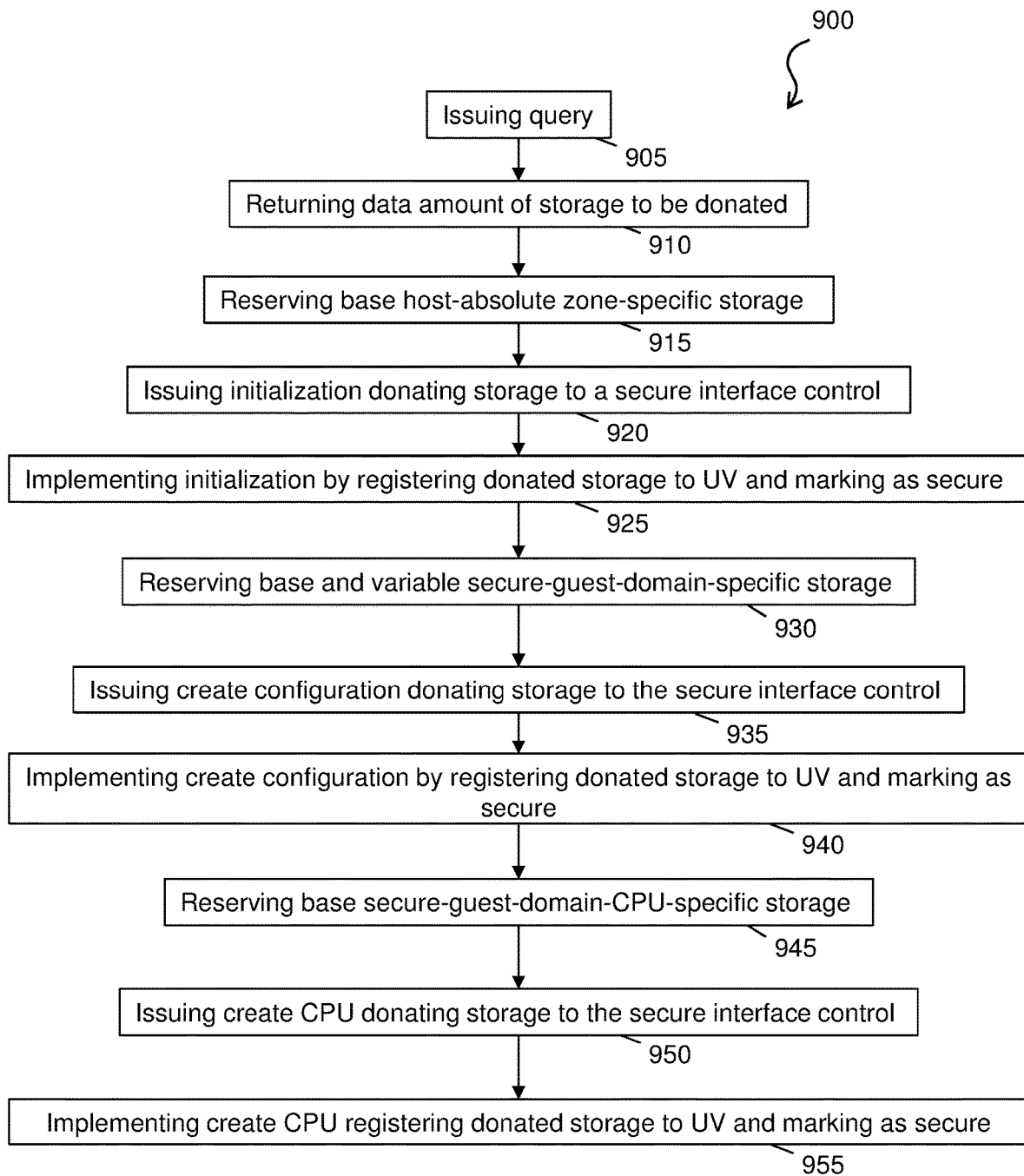
FIG. 9 depicts a process of a donated memory operation according to one or more embodiments of the present invention.

Turning now to FIG. 9, a process flow 900 regarding a donated memory operation is generally shown in accordance with one or more embodiments of the present invention. The process flow 900 begins at block 905, where a hypervisor issues a query UVC to the secure interface control. At block 910, the secure interface control returns data (e.g., Query UVC). This data can include an amount of base zone-specific host-absolute storage required; an amount of base secure-guest-domain-specific host-absolute storage required; an amount of variable secure-guest-domain-specific host-virtual storage required per MB; and/or amount of base secure-guest-CPU-specific host-absolute storage required.

At block 915, the hypervisor reserves base host-absolute zone-specific storage (e.g., based on a size returned by query UVC). At block 920, the hypervisor issues an initialization to the secure interface control. In this regard, the hypervisor can issue an initialize UVC that provides donated storage for the UV control blocks that are needed to coordinate between the secure guest configurations for the entire zone. The initialize UVC specifies a base zone-specific storage origin.

At block 925, the secure interface control implements the initialization (e.g., initialize UVC) by registering donated storage to UV and marking as secure. For the initialize UVC, the secure interface control can mark donated storage as secure; assign some of that donated storage for the zone-security table; and register the donated storage in zone-security table for UV use with a unique secure-domain, but with no associated secure-guest-domain and as having no associated host-virtual address pair.

At block 930, the hypervisor reserves storage (e.g., base and variable secure-guest-domain-specific storage). For example, the hypervisor reserves base and variable (e.g., based on a size of secure-guest-domain storage) secure-guest-domain-specific storage (e.g., a size returned by the query UVC). At block 935, the hypervisor issues a create configuration to the secure interface control. In this regard, the hypervisor can issue a create-secure-guest-config UVC that specifies base and variable secure-guest-domain-specific storage origin. Further, the create-secure-guest-config UVC provides donated storage for the UV control blocks that are needed to support this secure guest configuration.

At block 940, the secure interface control implements the create configuration (e.g., create-secure-guest-config UVC). For the create-secure-guest-config UVC, the secure interface control can mark donated storage as secure; register the donated storage in the zone-security table for UV use; and register the donated storage with the associated secure-guest-domain. The donated base (host-absolute) storage is registered as having no associated host-virtual address pair. The donated variable (host-virtual) storage is registered with the associated host-virtual address pair.

At block 945, the hypervisor reserves base secure-guest-CPU-specific storage (e.g., a size returned by the query-UV). At block 950, the hypervisor specifies a storage origin. For instance, the hypervisor issues to the UV create-secure-guest-CPU that specifies a base secure-guest-CPU-specific storage origin. At block 955, the secure interface control implements the create-CPU (e.g., create-secure-guest-CPU UVC). For the create-secure-guest-CPU UVC, the secure interface control can mark donated storage as secure and register donated storage in the zone-security table for UV use, but with no associated secure-guest-domain and as having no associated host-virtual address pair.

Figure 10:
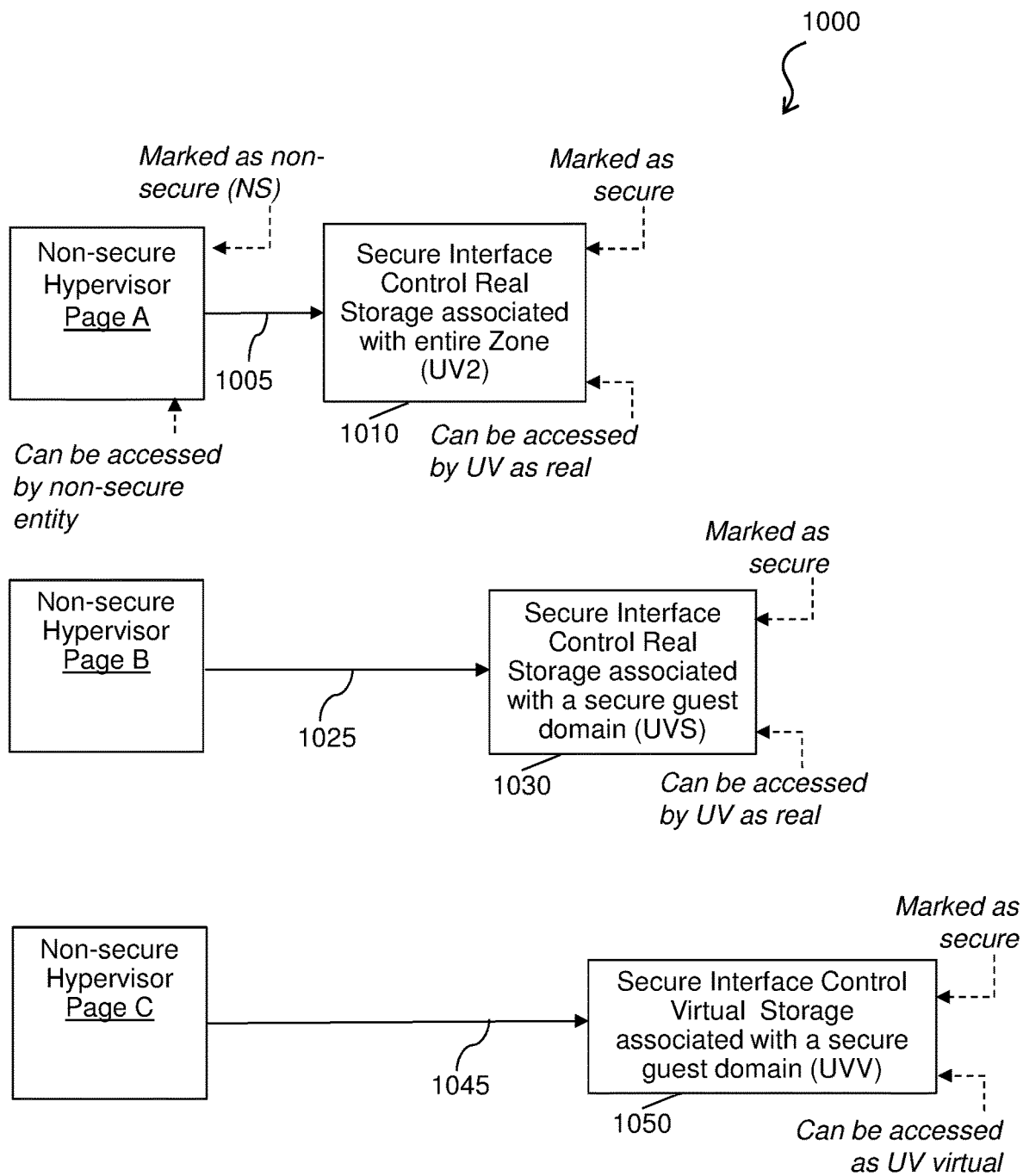
FIG. 10 depicts a process flow of a transition of non-secure hypervisor pages to secure pages of a secure interface control according to one or more embodiments of the present invention.

Turning now to FIG. 10, a process flow 1000 regarding a transition of non-secure hypervisor pages to secure pages of a secure interface control is generally shown in accordance with one or more embodiments of the present invention. In the process flow 1000, three hypervisor pages are shown (e.g., a non-secure hypervisor Page A, a non-secure hypervisor Page B, and a non-secure hypervisor Page C).

The hypervisor (non-secure) Pages A, B and C can be accessed by a non-secure entity (including the hypervisor). Further, hypervisor (non-secure) Pages A, B and C are marked as non-secure (NS), along with registered in a zone-security table (e.g., the zone-security table 100 shown in FIG. 1) as non-secure and non-shared. At arrow 1005, an initialize UVC is issued, which transitions Guest Page A to secure interface control real storage page 1010 associated with an entire zone (UV2). The secure interface control real storage 1010 can be marked as secure, along with registered in a zone-security table (e.g., the zone-security table 100 shown in FIG. 1) as UV with no secure guest domain and no hypervisor to host absolute (HV->HA) mapping. Instead it is registered with a unique UV2 secure domain and the DA-bit is set to 1. Note that the secure interface control real storage 1010 can be accessed by the secure interface control as real.

From the hypervisor (Non-secure) Page B, at arrow 1025, create-SG-config or create-SG-CPU UVC is issued, which transitions this page to a secure interface control real storage 1030 associated with a secure guest domain (UVS). The secure interface control real storage 1030 can be marked as secure, along with registered in a zone-security table (e.g., the zone-security table 100 shown in FIG. 1) as UV with an associated secure guest domain and no hypervisor to host absolute (HV->HA) mapping (i.e., DA-bit=1). Note that the secure interface control real storage 1010 can be accessed by the secure interface control as real on behalf of a secure guest domain.

From the hypervisor (non-secure) Page C, at arrow 1045, create-SG-config UVC is issued, which transitions this page to a secure interface control virtual storage 1050 associated with a secure guest domain (UVV). The secure interface control virtual storage 1050 can be marked as secure, along with registered in a zone-security table (e.g., the zone-security table 100 shown in FIG. 1) as UV with a secure guest domain and hypervisor to host absolute (HV->HA) mapping. Note that the secure interface control virtual storage 1050 can be accessed as UV virtual on behalf of a secure guest domain.

Figure 11:
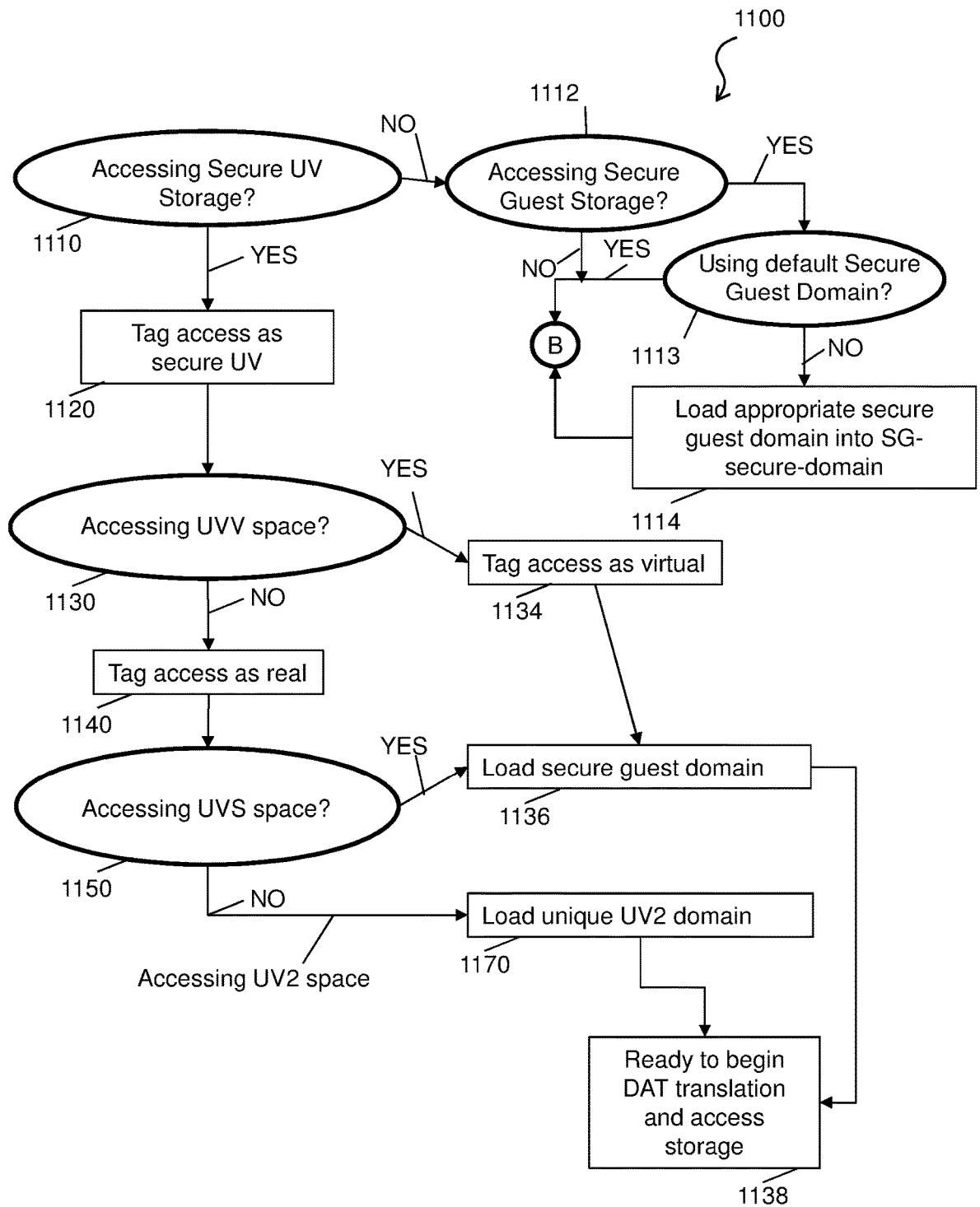
FIG. 11 depicts a process flow of a secure storage access made by the secure interface control according to one or more embodiments of the present invention.

Turning now to FIG. 11, a process flow 1100 regarding a secure storage access made by the program or the secure interface control is depicted in accordance with one or more embodiments. This represents the situation where the secure interface control is going to access guest storage or secure interface control storage and must tag that access correctly in order to allow the hardware to verify the security of that access. 1100 describes this tagging of storage accesses by the secure interface control. The process flow 1100 begins at block 1110, where the secure interface control determines whether it is making an access to a secure interface control storage.

If this is not an access to the secure interface control storage, then the process flow 1100 proceeds to decision block 1112 (as shown by the NO arrow). At decision block 1112, the secure interface control determines whether it is making an access to a secure guest storage. If this is not an access to the secure guest storage, then the process flow 1100 proceeds to "B" (which is connected to process flow 1200 of FIG. 12) which will use the default setting for non-secure accesses. If this is an access to the secure guest storage, then the process flow 1100 proceeds to decision block 1113, where the secure interface control determines if a default secure guest domain is being used. If yes, then the process flow 1100 proceeds to proceeds to "B" (which is connected to process flow 1200 of FIG. 12) which will use the default setting for secure guest accesses. If no, then the process flow 1100 proceeds to block 1114. At block 1114, an appropriate secure guest domain is loaded into SG-secure-domain register (and proceeds to "B", which is connected to process flow 1200 of FIG. 12).

If this is an access to the secure interface control storage, then the process flow 1100 proceeds to block 1120 (as shown by the YES arrow). At block 1120, the access is tagged as secure-UV (e.g., uses UV-secure-domain register).

The process flow 1100 then proceeds to decision block 1130, where the secure interface control determines whether this is an access to UVV space (e.g., SG-Config Variable Table). If it is an access to UVV space, then the process flow 1100 proceeds to block 1134 (as shown by the YES arrow). At block 1134, the access is tagged as virtual. At block 1136, an applicable secure guest domain is loaded into UV-secure-domain register. At block 1138, DAT translation and access storage is ready to begin. Returning to decision block 1130, if this is not an access to UVV space, then the process flow 1100 proceeds to block 1140 (as shown by the NO arrow). At block 1140, the access is tagged as real.

At decision block 1150, the secure interface control determines whether this is an access to UVS space (e.g., SG Configuration or CPU table). If this is an access to UVS space, then the process flow 1100 proceeds to block 1136 (as shown by the YES arrow). If this is not an access to UVS space, then the process flow 1100 proceeds to block 1170 (as shown by the NO arrow). This access would then be an access to UV2 space (e.g., Zone-Security Table). At block 1170, a unique UV2 secure domain is loaded into UV-secure-domain register.

Figure 12:
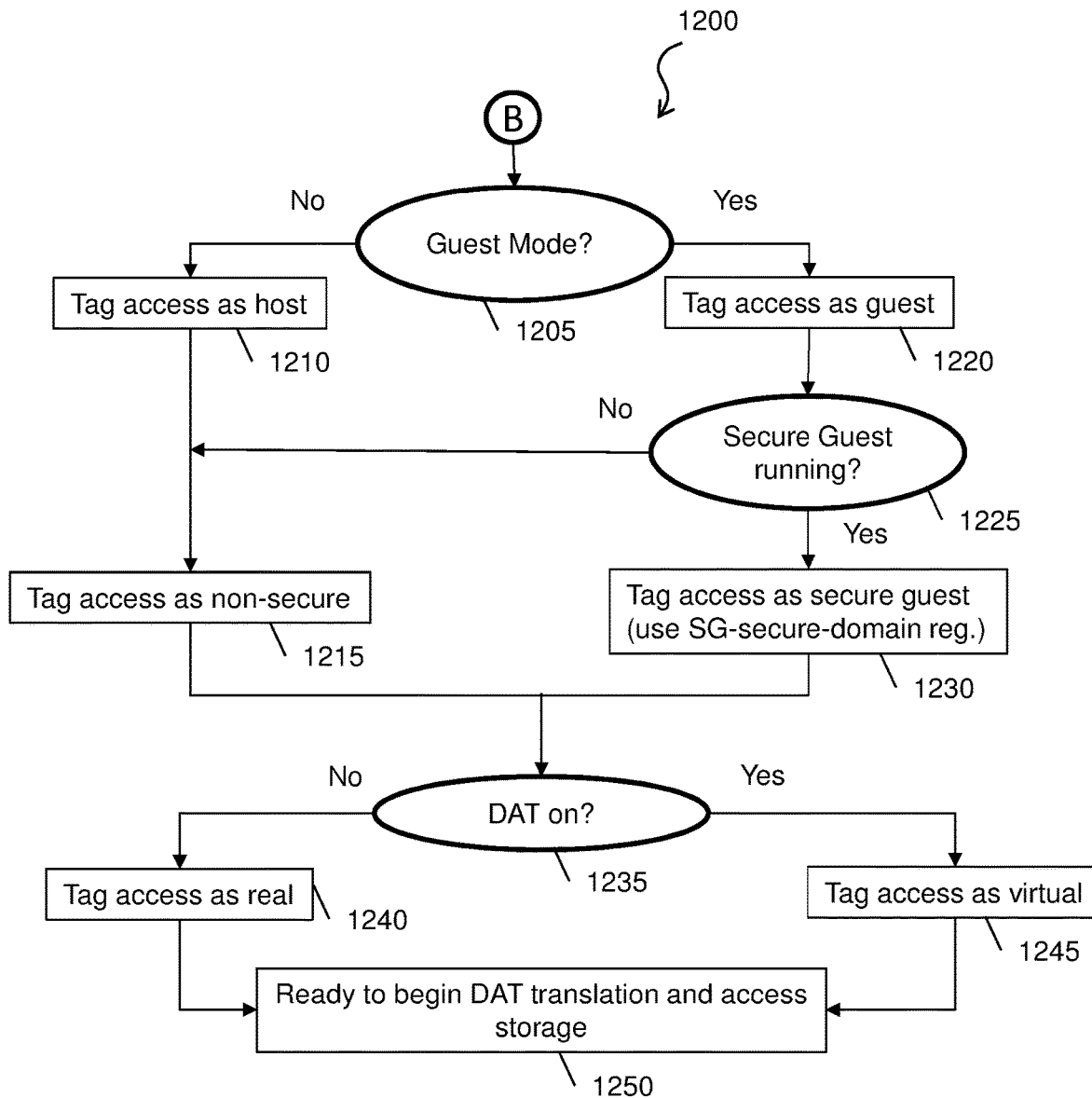
FIG. 12 depicts a process flow of access tagging by the secure interface control and by hardware according to one or more embodiments of the present invention.

FIG. 12 depicts a process flow 1200 in accordance with one or more embodiments of the present invention. When a guest is dispatched, SIE Entry firmware can indicate to the hardware that a guest is running (e.g., guest mode active) and can indicate whether the guest is secure. If the guest is secure, the associated secure guest domain can be loaded into the hardware (e.g., in the SG-secure-domain register). When a program is accessing storage, the hardware can tag the access based on the current state of the program at the time of the access. FIG. 12 illustrates an example of this process in process flow 1200. At block 1205, the hardware can determine whether the machine is currently running in guest mode and if not, can tag the access as being a host access at block 1210 and as being a non-secure access at block 1215. If the machine is running in guest mode at block 1205, the access can be tagged as a guest access at block 1220 and further determine whether the current guest is a secure guest at block 1225. If the guest is not secure, the access can be tagged as non-secure at block 1215. If the guest is secure, the hardware can tag the guest as secure at block 1230, which can associate the secure guest with the SG-secure-domain register that was loaded when the secure guest was dispatched. For both non-secure and secure guests, a DAT status can be checked at block 1235. The access can be tagged as real at block 1240, if DAT is off. The access can be tagged as virtual at block 1245, if DAT is on. Once the access is tagged as real at block 1240 with DAT off or as virtual at block 1245 with DAT on, the hardware is ready to begin translation and access storage at block 1250, as further described in FIG. 13.

Figure 13:
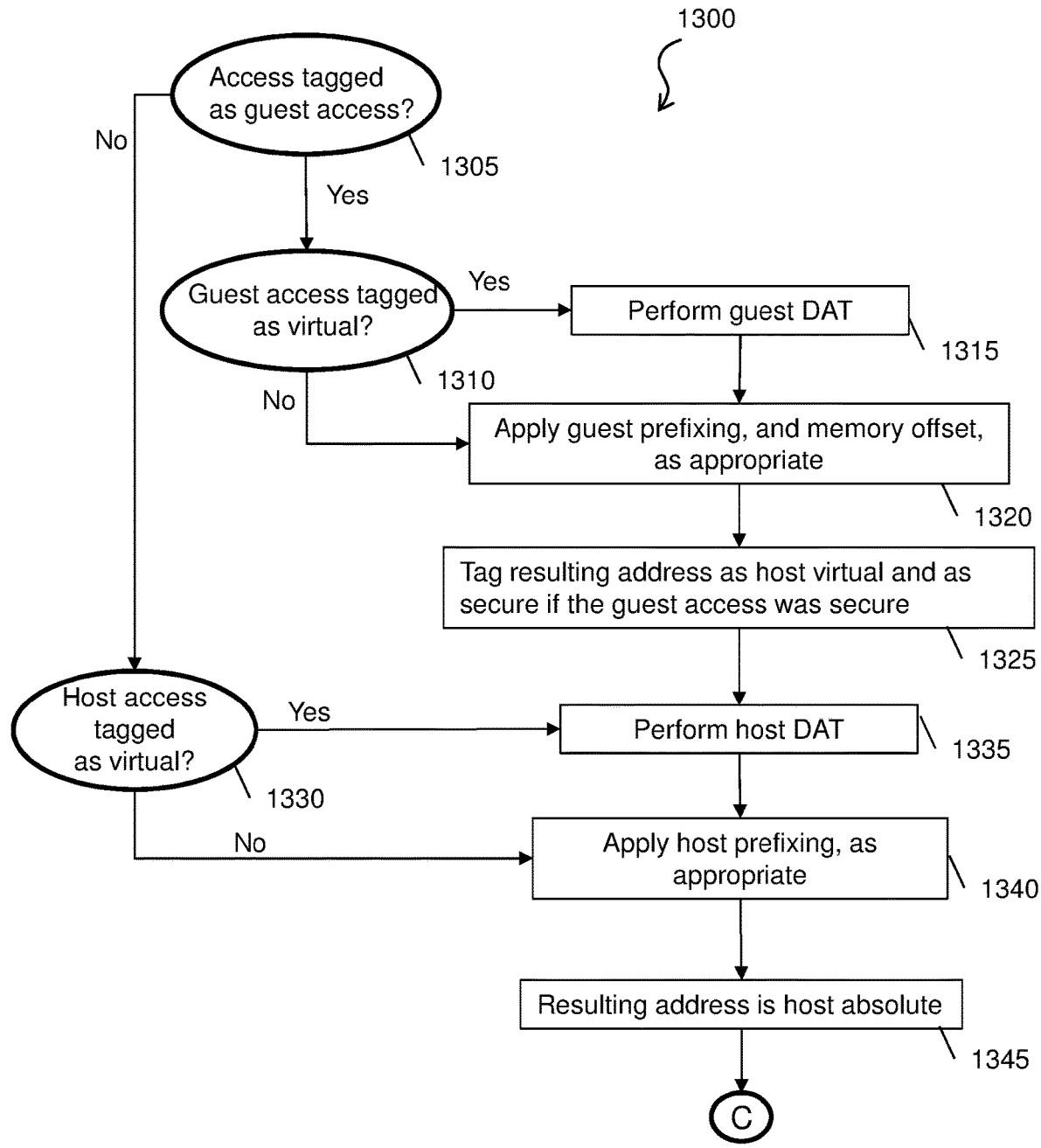
FIG. 13 depicts a process flow of translations to support secure and non-secure accesses by the program and by the secure interface control according to one or more embodiments of the present invention.

FIG. 13 depicts an example of translation done by the hardware to support both secure and non-secure accesses in process flow 1300 in accordance with one or more embodiments of the present invention. At block 1305, the hardware can determine whether the access is tagged as a guest translation, and if so, and the access is virtual at block 1310, then guest DAT can be performed at block 1315. During guest DAT translation, there can be nested, intermediate fetches for guest DAT tables. The table fetches can be tagged as guest real and as secure if the original translation was tagged as secure. The table fetches can also follow the translation process of process flow 1300. After the guest DAT is performed for an access tagged as guest virtual at block 1315 and for any access tagged as guest real at block 1310 (virtual=No), guest prefixing and guest memory offset can be applied at block 1320. At the completion of the guest translation process, the resulting address can be tagged as host virtual and as secure if the original guest translation was tagged as secure at block 1325. The process 1300 can continue as for any access tagged as host virtual. If the original access is a host access at block 1305, (guest=No) and virtual at block 1330, then host DAT can be performed block 1335. Host table fetches can be marked as non-secure at block 1335. After host DAT is performed at block 1335, or if the original host access was tagged as real (virtual=No) at block 1330, then host prefixing can be applied at block 1340. The resulting address can be a host absolute address at block 1345.

Figure 14:
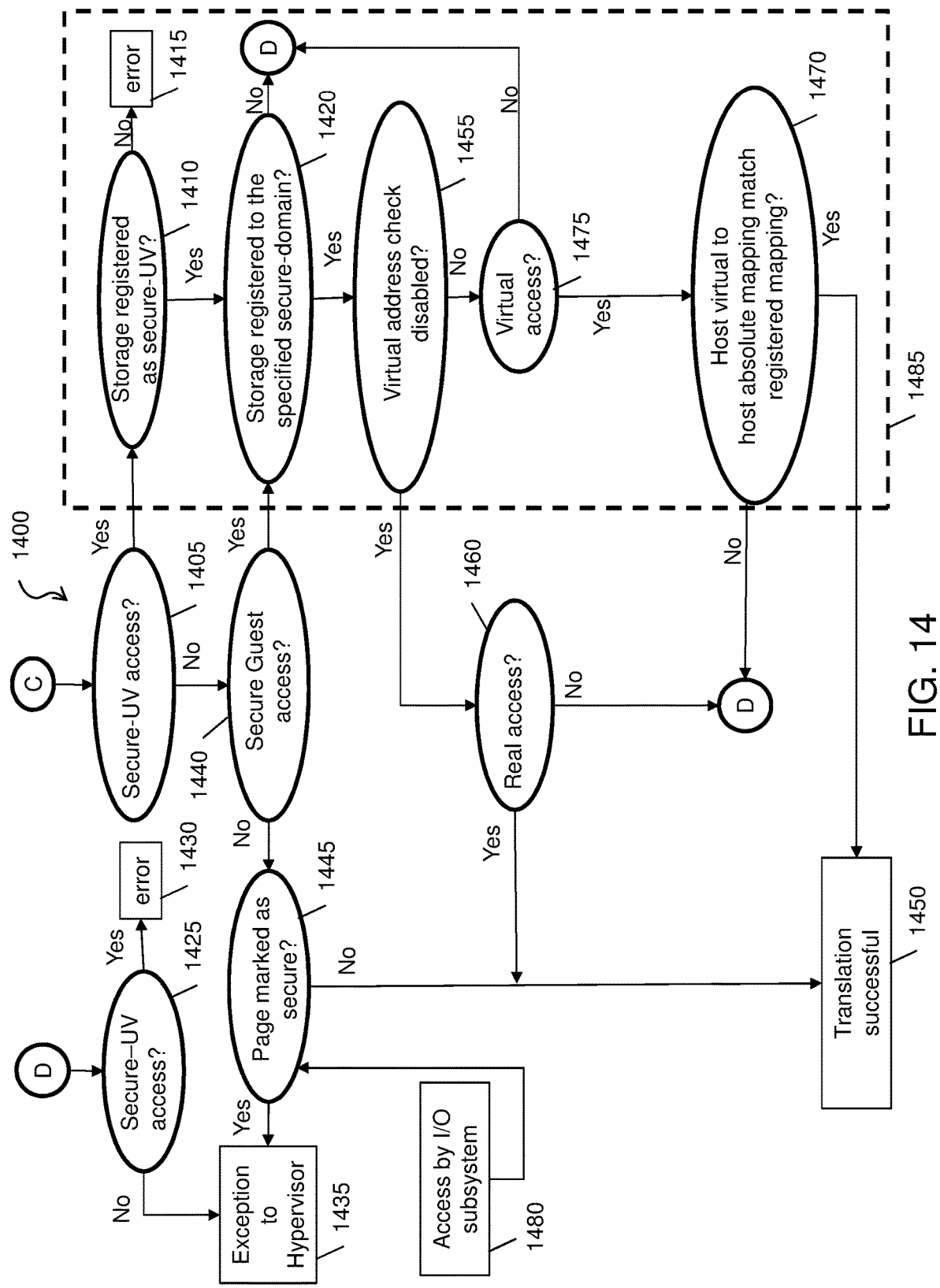
FIG. 14 depicts a process flow of a DAT with secure storage protection by the program and by the secure interface control according to one or more embodiments of the present invention.

FIG. 14 depicts an example of DAT translation with secure storage protection that can be performed by the hardware in process flow 1400 in accordance with one or more embodiments of the present invention. Continuing from block 1345 of FIG. 13, if a secure-UV access is identified at block 1405, then the hardware can verify whether the storage is registered as secure-UV storage at block 1410, and if not, an error is presented at block 1415. A secure-UV access can be made by the secure interface control when accessing UV storage. If the storage is registered as secure-UV storage at block 1410, then protection checks can continue as may be performed for any secure access except the UV-secure-domain-register (setup by the secure interface control before making a secure-UV access) can be used as the specified secure domain for the domain check at block 1420 where processing continues. In addition, any violation that is detected (entry point D) for a UV access at block 1425 can be presented as an error at block 1430 rather than an exception to the hypervisor at block 1435 as is done for a secure guest violation at block 1425 (Secure-UV=No).

For access that are not tagged as secure-UV accesses at block 1405, the hardware determines if the access is a secure guest access at block 1440, and if not, and if the page is marked as secure at block 1445, an exception can be presented to the hypervisor at block 1435. Otherwise, if the access is not a secure guest access at block 1440 and the page is not marked as secure at block 1445, then translation is successful at block 1450.

If the access is a secure guest access at block 1440 or a secure-UV access to storage registered as secure-UV storage at block 1410, the hardware can check to make sure the storage is registered to the secure entity associated with the access at block 1420. If this is a secure-UV access, the specified secure-domain can be obtained from the UV-secure-domain register (loaded by the secure interface control based on the secure-UV storage being accessed) and for a secure-guest access, the specified secure-domain is obtained from the SG-secure-domain register (loaded when the secure entity is dispatched). If the storage being accessed is not registered to the specified secure-domain at block 1420, then for secure-UV accesses at block 1425 an error is taken at block 1430 and for secure-guest accesses at block 1425 (secure-UV=No) an exception is presented to the hypervisor at block 1435.

For secure accesses to storage at block 1440 and block 1410 that are registered to the specified secure-domain at block 1420, if the virtual address check is disabled, i.e., the DA-bit=1 at block 1455 and the access is real at block 1460, then translation is complete at block 1450. If, however, the DA-bit=1 at block 1455 but the access is virtual at block 1460 (real=No), then for secure-UV accesses at block 1425 an error is taken at block 1430 and for secure-guest accesses at block 1425 (secure-UV=No) an exception is presented to the hypervisor at block 1435. If the DA-bit=0 at block 1455 and the access is a virtual access at block 1475, then the hardware can determine if the host virtual to host absolute mapping of the access matches that registered for this host absolute address at block 1470. If so, then translation completes successfully at block 1450. If the mapping does not match at block 1470, then for secure-UV accesses at block 1425 an error is taken at block 1430 and for secure-guest accesses at block 1425 (secure-UV=No) an exception is presented to the hypervisor at block 1435. If the DA-bit=0 and the access is a real access at block 1475 (virtual=No) then for secure-UV accesses at block 1425 an error is taken at block 1430 and for secure-guest accesses at block 1425 (secure-UV=No) an exception is presented to the hypervisor at block 1435; alternately, the translation may complete successfully at block 1450. Any access by the I/O subsystem at block 1480 can check to see if the page is marked as secure at block 1445 and if the page is secure, an exception can be presented to the hypervisor at block 1435; if the page is not marked as secure, the translation is successful at block 1450.

Various checks of storage registration and mapping can be managed collectively through zone security table interface 1485. For example, blocks 1410, 1420, 1455, 1470, and 1475 can interface with a zone security table that is associated with a same zone to manage various accesses.

Figure 15:
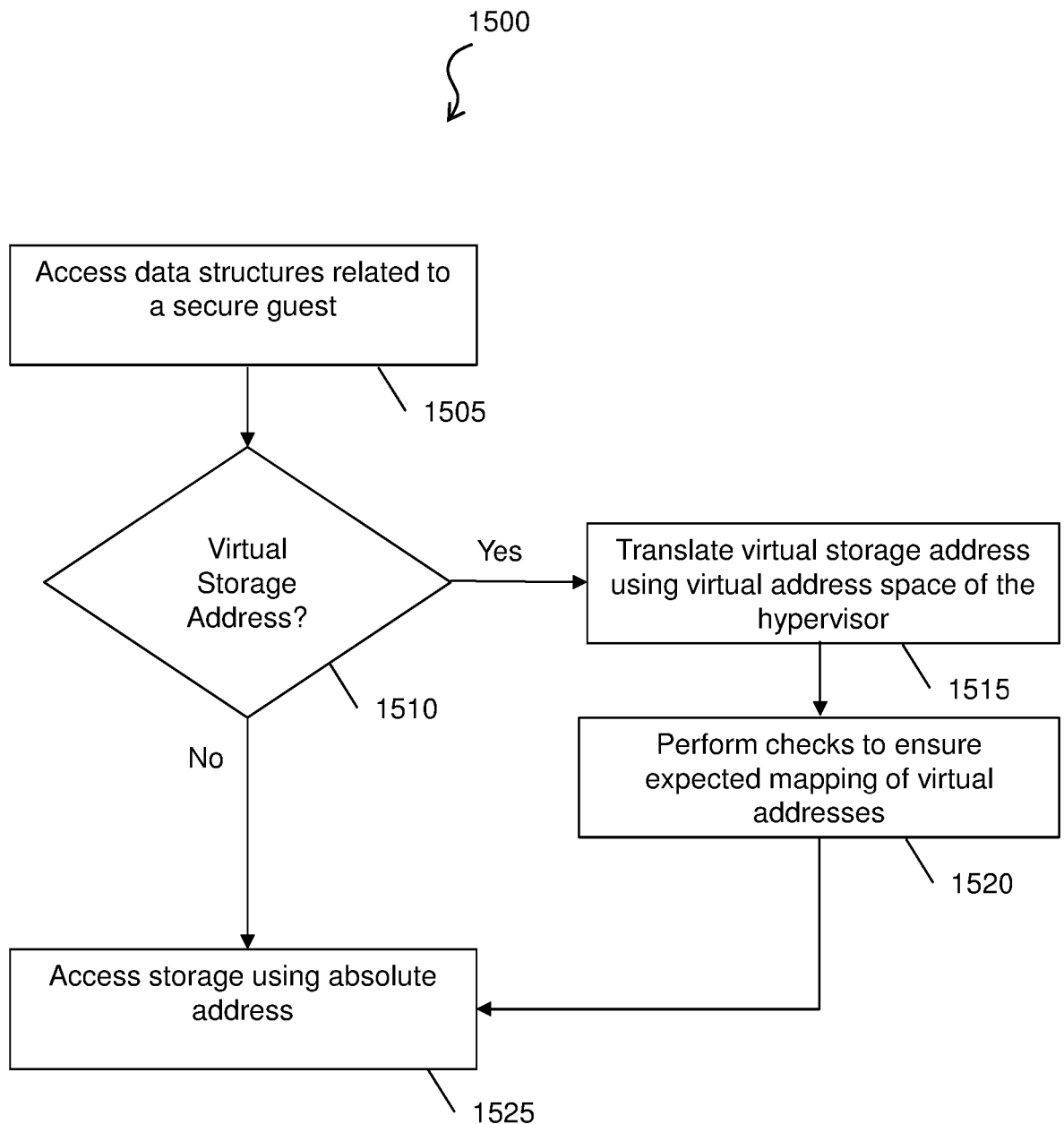
FIG. 15 depicts a process flow for an addressing mode determination according to one or more embodiments of the present invention.

Turning now to FIG. 15, a process flow 1500 for an addressing mode determination is generally shown in accordance with one or more embodiments of the present invention. As previously described with respect to FIG. 10, a secure interface control may access a page, such as Page B in UVS, that was established as real/absolute storage accessible through secure interface control real storage 1030. Further, the secure interface control may access a page, such as Page C in UVV, that was established as secure interface control virtual storage 1050 in the process flow 1000 of FIG. 10. Process flow 1100 of FIG. 11 can determine whether an access to UVV space, such as for an integrity table, should be performed at block 1130 or whether an access to UVS space should be performed at block 1150. Process flow 1500 further illustrates an address translation process that can support the process flow 1100 of FIG. 11. At block 1505 of FIG. 15, when the secure interface control needs to access one or more data structures related to a secure guest, such as an integrity table or zone security table 100 of FIG. 1, the process flow 1500 proceeds to block 1510. At block 1510, the secure interface control can determine whether the access is associated with a virtual storage address. At block 1515, if the access is associated with a virtual storage address, the secure interface control can translate the virtual storage address using virtual address space of the hypervisor, such as through a DAT table. At block 1520, the secure interface control and/or supporting hardware/firmware can perform one or more checks to ensure that an expected mapping of the virtual storage address (e.g., a mapping that was previously registered for this absolute page) is returned from the access through the hypervisor DAT. As one example, the secure interface control can confirm that the hypervisor did not change an associated host mapping of a data structure as previously configured. At block 1525, once the absolute address has been determined through a DAT table of the hypervisor, or if the access was already associated with an absolute address (e.g., block 1510=No), the secure interface control can access the data structure at the absolute address.

Figure 16:
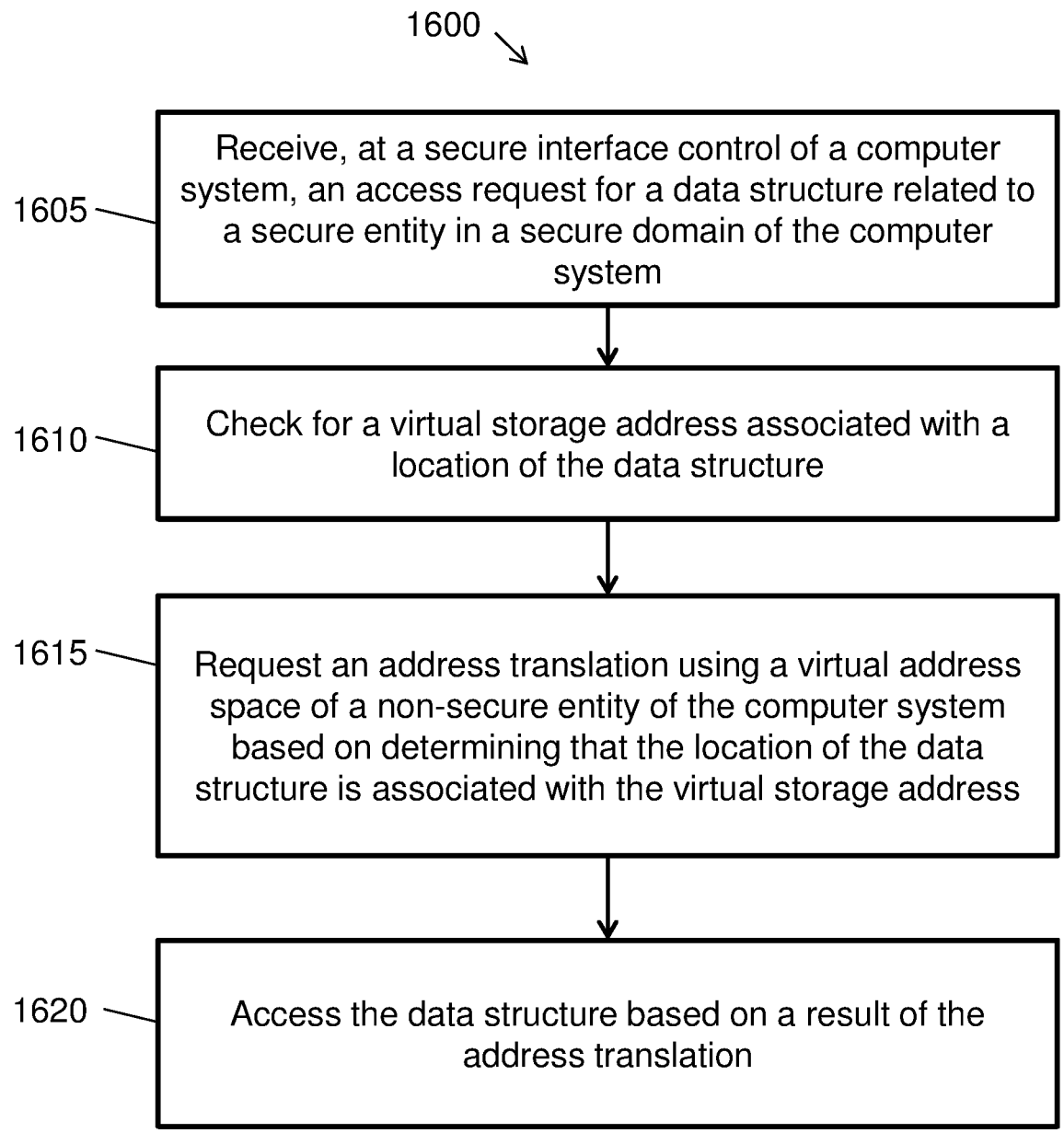
FIG. 16 depicts a process flow for using host virtual address space for secure interface control storage according to one or more embodiments of the present invention.

Turning now to FIG. 16, a process flow 1600 for using host virtual address space for secure interface control storage is generally shown in accordance with one or more embodiments of the present invention. The process flow 1600 is a variation of the process flow 1500 of FIG. 15. At block 1605, a secure interface control of a computer system can receive an access request for a data structure related to a secure entity in a secure domain of the computer system. The access request can be part of an internal sequence of managing security through the secure interface control. The secure entity can be one or more secure guests, such as VMs, or secure containers. At block 1610, the secure interface control can check for a virtual storage address associated with a location of the data structure. The data structure related to the secure entity in the secure domain can be distributed between a plurality of pages of memory. The pages of memory may be donated by a non-secure entity at a plurality of fixed locations for secure use by the secure interface control. The pages of memory donated by the non-secure entity can reside at a contiguous range of virtual addresses. The non-secure entity can be a hypervisor or operating system configured to host one or more secure guests or containers as the secure entity. Checking for the virtual storage address mapping can include inspecting a zone-security table 100 of FIG. 1 to determine whether a virtual address compare associated with a host virtual address is enabled or disabled (e.g., DA bit 140 state).

At block 1615, the secure interface control can perform an address translation using a virtual address space of a non-secure entity of the computer system based on determining that the location of the data structure is associated with a virtual storage address. The address translation can be performed using any of the processes and elements as previously described. A mapping of the virtual storage address provided by the non-secure entity can be verified by the secure interface control. Verification of the mapping of the virtual storage address may include checking for a change in the mapping compared to a previous, registered mapping. The mapping by address translation tables can be configured to present the pages of memory which are distributed in non-contiguous absolute locations as contiguous virtual addresses. Thus, data structures that cannot fit in a contiguous block of absolute memory may appear as contiguous in the virtual address space of the host.

At block 1620, the secure interface control can access the data structure based on the absolute address resulting from the address translation. Alternatively, the secure interface control can access the data structure directly using an absolute address based on determining that the location of the data structure is not associated with the virtual storage address.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, VMs, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
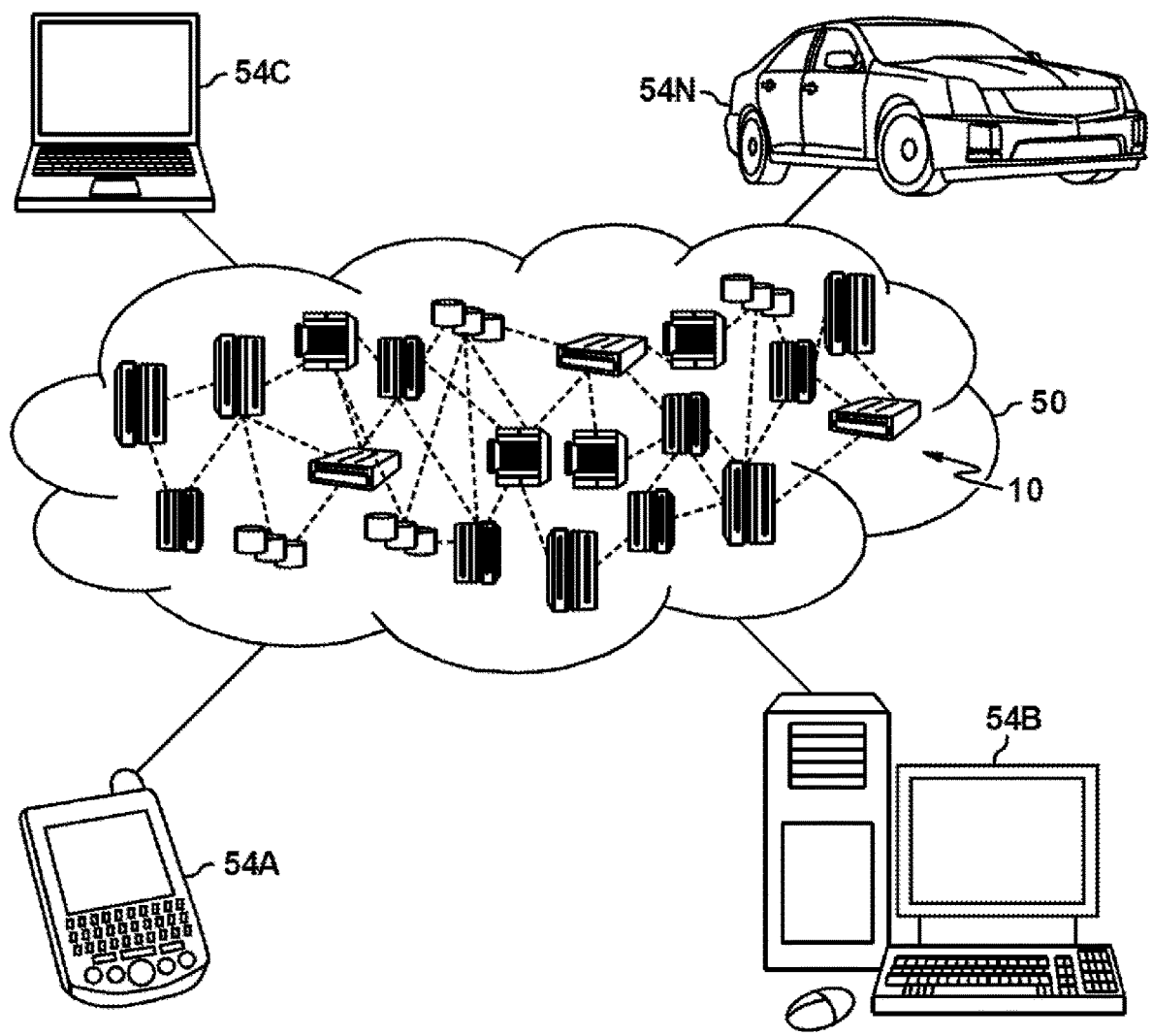
FIG. 17 illustrates a cloud computing environment according to one or more embodiments of the present invention.

Referring now to FIG. 17, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Figure 18:
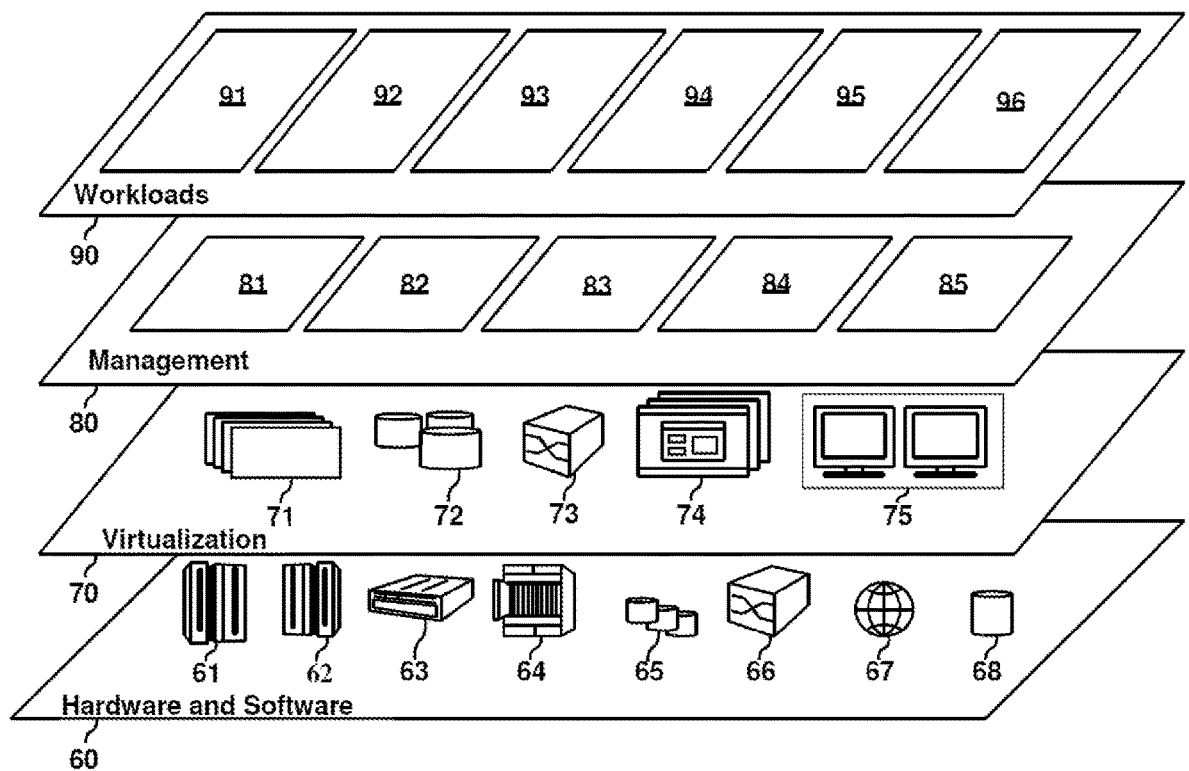
FIG. 18 depicts abstraction model layers according to one or more embodiments of the present invention.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to secure storage associated with a virtual machine 96. It is understood that these are just some examples and that in other embodiments, the layers can include different services.

Figure 19:
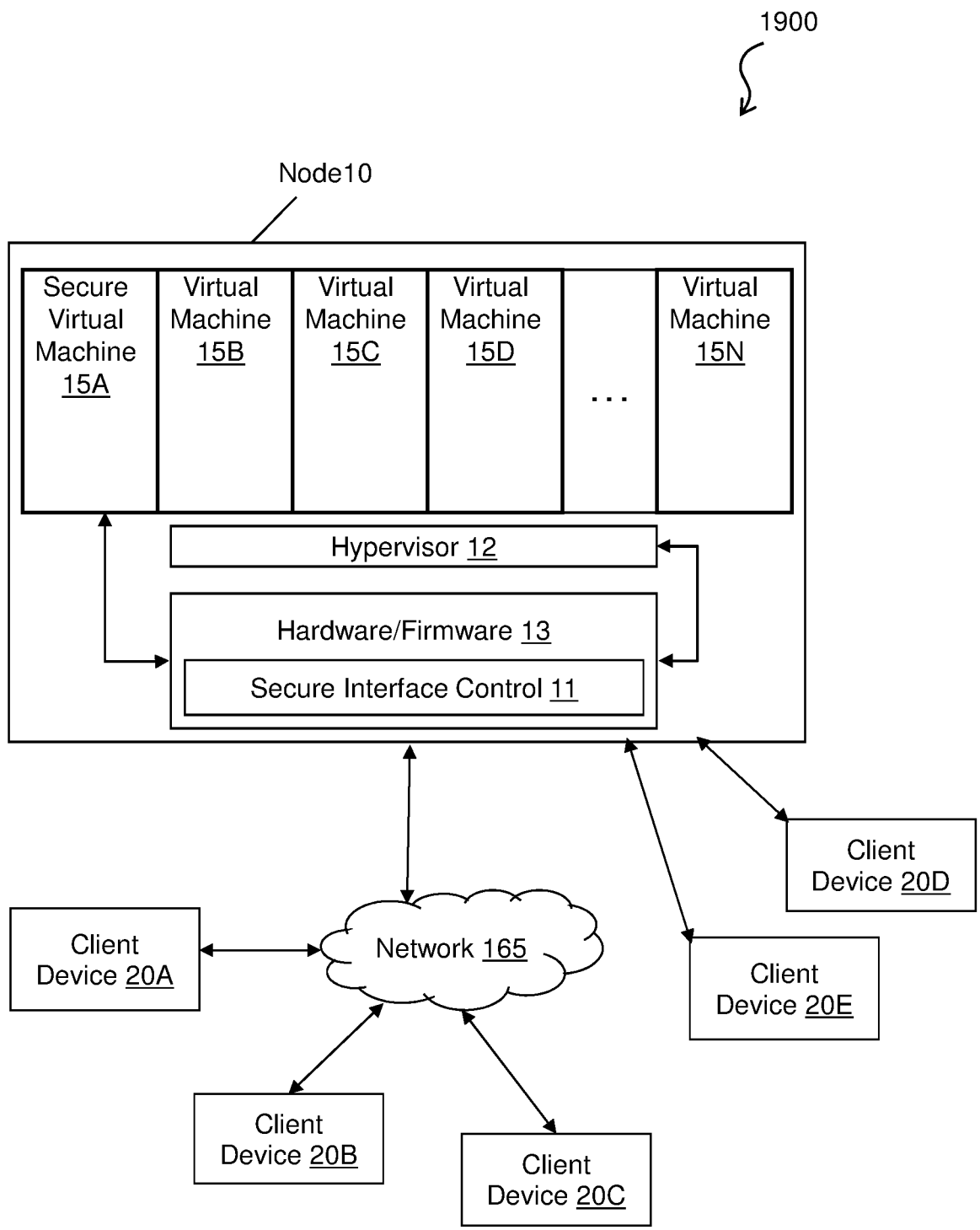
FIG. 19 depicts a system according to one or more embodiments of the present invention.

Turning now to FIG. 19, a system 1900 is depicted in accordance with one or more embodiments of the present invention. The system 1900 includes an example node 10 (e.g., a hosting node) that is in direct or indirect communication with one or more client devices 20A-20E, such as via a network 165. The node 10 can be a datacenter or host server, of a cloud-computing provider. The node 10 executes a hypervisor 12, which facilitates deploying one or more VMs 15 (15A-15N). The node 10 further includes a hardware/firmware layer 13 that includes a secure interface control 11. The secure interface control 11 includes one or more hardware modules and firmware that facilitates the hypervisor 12 to provide one or more services to the virtual machines 15. There can be communications between hypervisor 12 and the secure interface control 11; the secure interface control 11 and one or more VMs 15; the hypervisor 12 and the one or more VMs 15; and the hypervisor 12 to VMs 15 through the secure interface control 11. To facilitate a secure VM environment, the hosting node 10 according to one or more embodiments of the present invention, does not include any direct communications between the hypervisor 12 and the one or more VMs 15.

For example, the node 10 can facilitate a client device 20A to deploy one or more of the VMs 15A-15N. The VMs 15A-15N may be deployed in response to respective requests from distinct client devices 20A-20E. For example, the VM 15A may be deployed by the client device 20A, the VM 15B may be deployed by the client device 20B, and the VM 15C may be deployed by the client device 20C. The node 10 may also facilitate a client to provision a physical server (without running as a VM). The examples described herein embody the provisioning of resources in the node 10 as part of a VM, however the technical solutions described can also be applied to provision the resources as part of a physical server.

In an example, the client devices 20A-20E may belong to the same entity, such as a person, a business, a government agency, a department within a company, or any other entity, and the node 10 may be operated as a private cloud of the entity. In this case, the node 10 solely hosts VMs 15A-15N that are deployed by the client devices 20A-20E that belong to the entity. In another example, the client devices 20A-20E may belong to distinct entities. For example, a first entity may own the client device 20A, while a second entity may own the client device 20B. In this case, the node 10 may be operated as a public cloud that hosts VMs from different entities. For example, the VMs 15A-15N may be deployed in a shrouded manner in which the VM 15A does not facilitate access to the VM 15B. For example, the node 10 may shroud the VMs 15A-15N using an IBM z Systems® Processor Resource/Systems Manager (PR/SM) Logical Partition (LPAR) feature. These features, such as PR/SM LPAR provide isolation between partitions, thus facilitating the node 10 to deploy two or more VMs 15A-15N for different entities on the same physical node 10 in different logical partitions. The PR/SM LPAR hypervisor is implemented in trusted, internal firmware with specific hardware to provide this isolation.

A client device 20A from the client devices 20A-20e is a communication apparatus such as a computer, a smartphone, a tablet computer, a desktop computer, a laptop computer, a server computer, or any other communication apparatus that requests deployment of a VM by the hypervisor 12 of the node 10. The client device 20A may send a request for receipt by the hypervisor via the network 165. A VM 15A, from the VMs 15A-15N is a VM image that the hypervisor 12 deploys in response to a request from the client device 20A from the client devices 20A-20e. The hypervisor 12 is a VM monitor (VMM), which may be software, firmware, or hardware that creates and runs VMs. The hypervisor 12 facilitates the VM 15A to use the hardware components of the node 10 to execute programs and/or store data. With the appropriate features and modifications the hypervisor 12 may be IBM z Systems®, Oracle's VM Server, Citrix's XenServer, Vmware's ESX, Microsoft Hyper-V hypervisor, or any other hypervisor. The hypervisor 12 may be a native hypervisor executing on the node 10 directly, or a hosted hypervisor executing on another hypervisor.

Figure 20:
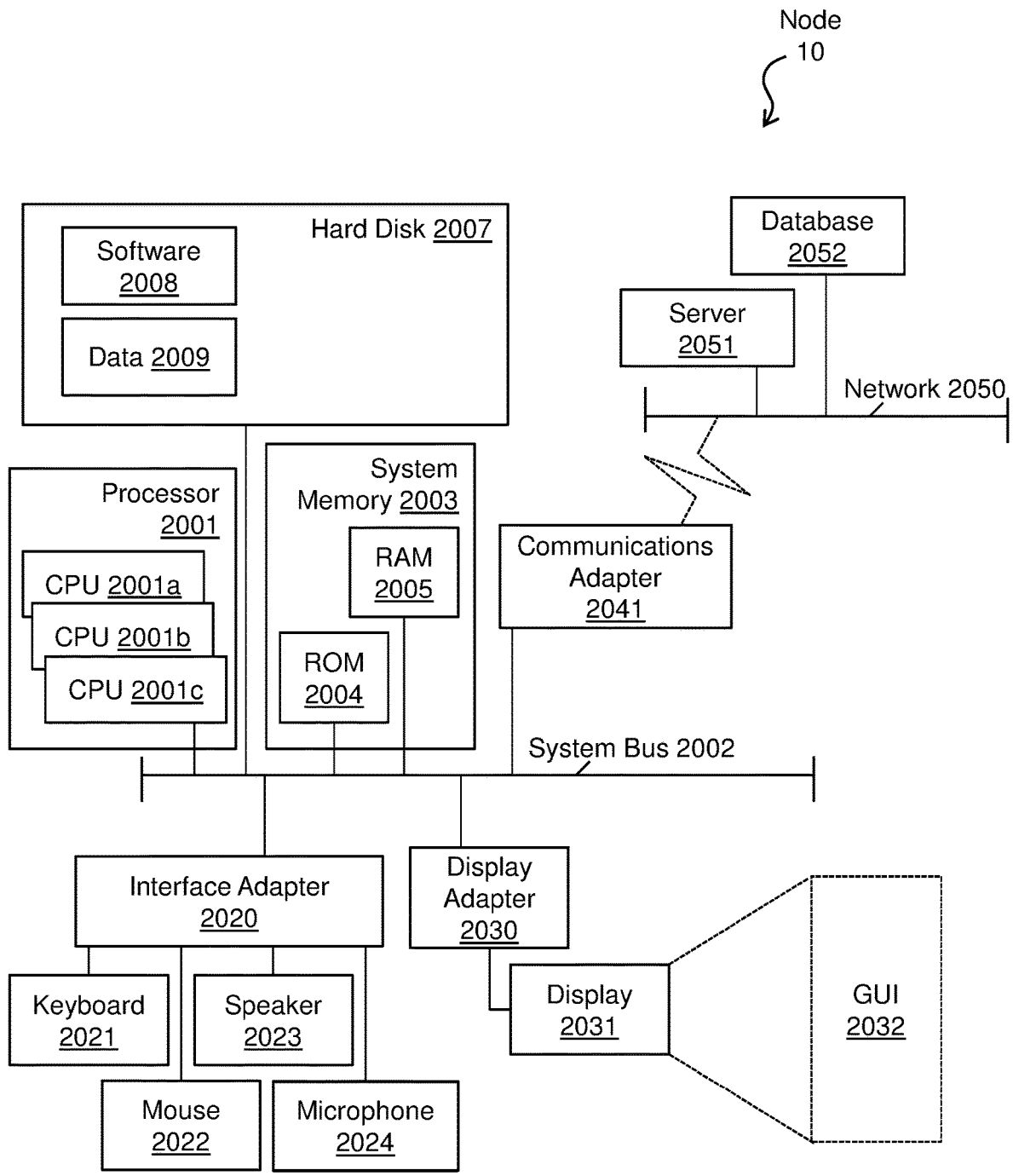
FIG. 20 depicts a processing system according to one or more embodiments of the present invention.

Turning now to FIG. 20, a node 10 for implementing the teachings herein is shown in according to one or more embodiments of the invention. The node 10 can be an electronic, computer framework comprising and/or employing any number and combination of computing device and networks utilizing various communication technologies, as described herein. The node 10 can be easily scalable, extensible, and modular, with the ability to change to different services or reconfigure some features independently of others.

In this embodiment, the node 10 has a processor 2001, which can include one or more central processing units (CPUs) 2001*a*, 2001*b*, 2001*c*, etc. The processor 2001, also referred to as a processing circuit, microprocessor, computing unit, is coupled via a system bus 2002 to a system memory 2003 and various other components. The system memory 2003 includes read only memory (ROM) 2004 and random access memory (RAM) 2005. The ROM 2004 is coupled to the system bus 2002 and may include a basic input/output system (BIOS), which controls certain basic functions of the node 10. The RAM is read-write memory coupled to the system bus 2002 for use by the processor 2001.

The node 10 of FIG. 20 includes a hard disk 2007, which is an example of a tangible storage medium readable executable by the processor 2001. The hard disk 2007 stores software 2008 and data 2009. The software 2008 is stored as instructions for execution on the node 10 by the processor 2001 (to perform process, such as the processes described with reference to FIGS. 1-19. The data 2009 includes a set of values of qualitative or quantitative variables organized in various data structures to support and be used by operations of the software 2008.

The node 10 of FIG. 20 includes one or more adapters (e.g., hard disk controllers, network adapters, graphics adapters, etc.) that interconnect and support communications between the processor 2001, the system memory 2003, the hard disk 2007, and other components of the node 10 (e.g., peripheral and external devices). In one or more embodiments of the present invention, the one or more adapters can be connected to one or more I/O buses that are connected to the system bus 2002 via an intermediate bus bridge, and the one or more I/O buses can utilize common protocols, such as the Peripheral Component Interconnect (PCI).

As shown, the node 10 includes an interface adapter 2020 interconnecting a keyboard 2021, a mouse 2022, a speaker 2023, and a microphone 2024 to the system bus 2002. The node 10 includes a display adapter 2030 interconnecting the system bus 2002 to a display 2031. The display adapter 2030 (and/or the processor 2001) can include a graphics controller to provide graphics performance, such as a display and management of a GUI 2032. A communications adapter 2041 interconnects the system bus 2002 with a network 2050 enabling the node 10 to communicate with other systems, devices, data, and software, such as a server 2051 and a database 2052. In one or more embodiments of the present invention, the operations of the software 2008 and the data 2009 can be implemented on the network 2050 by the server 2051 and the database 2052. For instance, the network 2050, the server 2051, and the database 2052 can combine to provide internal iterations of the software 2008 and the data 2009 as a platform as a service, a software as a service, and/or infrastructure as a service (e.g., as a web application in a distributed system).

Embodiments described herein are necessarily rooted in computer technology, and particularly computer servers that host VMs. Further, one or more embodiments of the present invention facilitate an improvement to the operation of computing technology itself, in particular computer servers that host VMs, by facilitating the computer servers that host VMs to host secure VMs, in which even the hypervisor is prohibited from accessing memory, registers, and other such data associated with the secure VM. In addition, one or more embodiments of the present invention provide significant steps towards the improvements of the VM hosting computing servers by using a secure interface control (also referred to herein as "UV") that includes hardware, firmware (e.g., millicode), or a combination thereof to facilitate a separation of the secure VM and the hypervisor, and thus maintaining a security of the VMs hosted by the computing server. The secure interface control provides lightweight intermediate operations to facilitate the security, without adding substantial overhead to securing VM state during initialization/exit of VMs as described herein.

Embodiments of the invention disclosed herein may include system, method, and/or computer program product (herein a system) that control access to secure storage of a VM. Note that, for each of explanation, identifiers for elements are reused for other similar elements of different figures.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, at a secure interface control of a computer system, an access request for a data structure related to a secure entity in a secure domain of the computer system, wherein the secure interface control comprises firmware, hardware, trusted software or a combination of firmware, hardware, and trusted software;
checking, by the secure interface control, for a virtual storage address associated with a location of the data structure, wherein checking for the virtual storage address further comprises inspecting a zone-security table to determine whether a virtual address compare indicator associated with a host virtual address is enabled or disabled, wherein the zone-security table comprises one entry for each page of host absolute storage, each entry is indexed by a host absolute address, and each entry comprises information to verify the entry as belonging to the secure entity;
verifying, by the secure interface control, a mapping of the virtual storage address provided by the non-secure entity based on determining that the virtual address compare indicator is enabled;
requesting, by the secure interface control, an address translation using a virtual address space of a non-secure entity of the computer system based on determining that the location of the data structure is associated with the virtual storage address; and
accessing, by the secure interface control, the data structure based on a result of the address translation.

2. The method of claim 1, further comprising:
accessing, by the secure interface control, the data structure using an absolute address based on a determining that the location of the data structure is not associated with the virtual storage address.

3. The method of claim 1, wherein verifying the mapping of the virtual storage address comprises checking for a change in the mapping compared to a previous mapping.

4. The method of claim 1, wherein the data structure related to the secure entity in the secure domain is distributed between a plurality of pages of memory.

5. The method of claim 4, wherein one or more pages of memory donated by the non-secure entity reside at a contiguous range of virtual addresses.

6. The method of claim 1, wherein the non-secure entity comprises a hypervisor configured to host one or more secure guests as the secure entity.

7. A system comprising:
a memory;
a processing unit; and
a secure interface control comprising firmware, hardware, trusted software or a combination of firmware, hardware, and trusted software, the secure interface control configured to perform a plurality of operations comprising:
receiving an access request for a data structure related to a secure entity in a secure domain;
checking for a virtual storage address associated with a location of the data structure in the memory, wherein checking for the virtual storage address further comprises inspecting a zone-security table to determine whether a virtual address compare indicator associated with a host virtual address is enabled or disabled, wherein the zone-security table comprises one entry for each page of host absolute storage, each entry is indexed by a host absolute address, and each entry comprises information to verify the entry as belonging to the secure entity;

verifying a mapping of the virtual storage address provided by the non-secure entity based on determining that the virtual address compare indicator is enabled;

requesting an address translation using a virtual address space of a non-secure entity of the processing unit based on determining that the location of the data structure is associated with the virtual storage address; and accessing the data structure based on a result of the address translation.

8. The system of claim 7, wherein the secure interface control is configured to perform operations comprising:

accessing the data structure using an absolute address based on a determining that the location of the data structure is not associated with the virtual storage address.

9. The system of claim 7, wherein verifying the mapping of the virtual storage address comprises checking for a change in the mapping compared to a previous mapping.

10. The system of claim 7, wherein the data structure related to the secure entity in the secure domain is distributed between a plurality of pages of the memory.

11. The system of claim 10, wherein one or more pages of memory donated by the non-secure entity reside at a contiguous range of virtual addresses.

12. The system of claim 7, wherein the non-secure entity comprises a hypervisor configured to host one or more secure guests as the secure entity.

13. A computer program product comprising a computer readable storage medium, the computer readable storage medium comprising computer executable instructions, which when executed by a secure interface control of a processing unit causes the processing unit to perform a method comprising:

receiving, at the secure interface control, an access request for a data structure related to a secure entity in a secure domain, wherein the secure interface control comprises firmware, hardware, trusted software or a combination of firmware, hardware, and trusted software;

checking, by the secure interface control, for a virtual storage address associated with a location of the data structure, wherein checking for the virtual storage address further comprises inspecting a zone-security table to determine whether a virtual address compare indicator associated with a host virtual address is enabled or disabled, wherein the zone-security table comprises one entry for each page of host absolute storage, each entry is indexed by a host absolute address, and each entry comprises information to verify the entry as belonging to the secure entity;

verifying, by the secure interface control, a mapping of the virtual storage address provided by the non-secure entity based on determining that the virtual address compare indicator is enabled;

requesting, by the secure interface control, an address translation using a virtual address space of a non-secure entity based on determining that the location of the data structure is associated with the virtual storage address; and accessing, by the secure interface control, the data structure based on a result of the address translation.

14. The computer program product of claim 13, wherein the executable instructions further cause the processing unit to perform:

accessing, by the secure interface control, the data structure using an absolute address based on a determining that the location of the data structure is not associated with the virtual storage address.

15. The computer program product of claim 13, wherein verifying the mapping of the virtual address comprises checking for a change in the mapping compared to a previous mapping.

16. The computer program product of claim 13, wherein the data structure related to the secure entity in the secure domain is distributed between a plurality of pages of memory.

17. The computer program product of claim 16, wherein one or more pages of memory donated by the non-secure entity reside at a contiguous range of virtual addresses.

18. The computer program product of claim 13, wherein the non-secure entity comprises a hypervisor configured to host one or more secure guests as the secure entity.

* * * * *